United States Patent
Bandyopadhyay et al.

(10) Patent No.: US 11,004,006 B2
(45) Date of Patent: May 11, 2021

(54) METHOD AND SYSTEM FOR DYNAMIC TRUST MODEL FOR PERSONALIZED RECOMMENDATION SYSTEM IN SHARED AND NON-SHARED ECONOMY

(71) Applicant: Conduent Business Services, LLC, Dallas, TX (US)

(72) Inventors: Jayati Bandyopadhyay, Karnataka (IN); Nupur Labh, Karnataka (IN); Simarjot Kaur, Karnataka (IN); Arun Rajkumar, Chennai (IN); Saurabh Srivastava, Karnataka (IN); Saurav Bhattacharya, Karnataka (IN); Neha Singh, Karnataka (IN)

(73) Assignee: Conduent Business Services, LLC, Florham Park, NJ (US)

( * ) Notice: Subject to any disclaimer, the term of this patent is extended or adjusted under 35 U.S.C. 154(b) by 423 days.

(21) Appl. No.: 16/117,942

(22) Filed: Aug. 30, 2018

(65) Prior Publication Data
US 2020/0074333 A1    Mar. 5, 2020

(51) Int. Cl.
*G06N 5/04*    (2006.01)
*G06N 20/00*    (2019.01)

(52) U.S. Cl.
CPC ............. *G06N 5/048* (2013.01); *G06N 20/00* (2019.01)

(58) Field of Classification Search
USPC .......................................................... 706/12
See application file for complete search history.

(56) References Cited

U.S. PATENT DOCUMENTS

| | | | |
|---|---|---|---|
| 6,377,828 B1 * | 4/2002 | Chaiken | A61B 5/14532 356/301 |
| 7,080,019 B1 | 7/2006 | Hurzeler | |
| 7,480,716 B2 * | 1/2009 | Ehrich | G06Q 30/0256 709/224 |
| 7,519,704 B2 * | 4/2009 | Ehrich | G06Q 30/02 709/224 |
| 7,756,633 B2 * | 7/2010 | Huang | G06Q 40/00 701/517 |
| 7,958,552 B2 * | 6/2011 | Arnold | G06F 21/62 726/17 |

(Continued)

OTHER PUBLICATIONS

"Contextual Bandits and Reinforcement Learning"; Source: https://blog.iterable.com/why-you-should-become-a-multi-armed-bandit-1cb6651063f5; Downloaded Aug. 5, 2018.

(Continued)

*Primary Examiner* — Michael B Holmes
(74) *Attorney, Agent, or Firm* — Ortiz & Lopez, PLLC; Luis M. Ortz; Kermit D. Lopez

(57) ABSTRACT

Methods and systems for personalized trust recommendation based on a dynamic trust model. In an example embodiment, a trust framework can be derived from a set of use-case specific factors. Invasive data and non-invasive data can be collected from a user (or a group of users) based on activity data and profile data associated with the user. A dynamic trust profile can be created (or learned) based on the invasive data and the non-invasive data collected from the user. A recommended level of trustworthiness can be then provided to the user respect to a particular situation and/or entity (e.g. other users) within the trust framework based on the dynamic trust profile of the user and which is personalized for the user.

20 Claims, 14 Drawing Sheets

(56) References Cited

U.S. PATENT DOCUMENTS

| | | | |
|---|---|---|---|
| 8,150,502 B2* | 4/2012 | Kumar | A61B 5/04325 |
| | | | 600/509 |
| 8,160,682 B2* | 4/2012 | Kumar | A61B 5/6833 |
| | | | 600/509 |
| 8,255,977 B2* | 8/2012 | Xiao | H04L 9/3263 |
| | | | 726/3 |
| 8,509,867 B2* | 8/2013 | Workman | A61B 5/14539 |
| | | | 600/316 |
| 8,635,662 B2* | 1/2014 | Lang | G06F 21/31 |
| | | | 726/1 |
| 8,688,352 B2 | 4/2014 | Khunger et al. | |
| 8,688,378 B2 | 4/2014 | McCall et al. | |
| 8,672,394 B2 | 6/2014 | Guh | |
| 9,753,990 B2 | 9/2017 | Novotny et al. | |
| 9,881,092 B2 | 1/2018 | Zeng et al. | |
| 9,924,306 B2 | 3/2018 | Flinn et al. | |
| 10,032,037 B1 | 6/2018 | Allen | |
| 10,033,756 B1 | 6/2018 | Rangarajan et al. | |
| 10,037,553 B2 | 7/2018 | Ross et al. | |
| 10,325,228 B2* | 6/2019 | Khan | G06Q 10/063112 |
| 2007/0064626 A1 | 3/2007 | Evans | |
| 2007/0143128 A1 | 6/2007 | Tokarev et al. | |
| 2008/0275719 A1 | 11/2008 | Davis et al. | |
| 2009/0112989 A1 | 4/2009 | Anderson et al. | |
| 2009/0177691 A1 | 7/2009 | Manfredi et al. | |
| 2011/0112901 A1 | 5/2011 | Fried et al. | |
| 2011/0252121 A1 | 10/2011 | Borgs et al. | |
| 2015/0208203 A1 | 7/2015 | Cao et al. | |
| 2016/0150037 A1 | 5/2016 | Hu et al. | |
| 2018/0150890 A1 | 5/2018 | Gupta et al. | |
| 2018/0176327 A1 | 6/2018 | Bentil et al. | |

OTHER PUBLICATIONS

"Contextual Bandits"; https://getstream.io/blog/introduction-contextual-bandits/, Downloaded Aug. 5, 2018.

Yuhui Zhong, Bharat Bhargava, Yi Lu, and Pelin Angin, "A Computational Dynamic Trust Model for User Authorization"; IEEE Transactions on Dependable and Secure Computing, vol. 12, No. 1, Jan./Feb. 2015.

Hao Tian 1 and Peifeng Liang, "Improved Recommendations Based on Trust Relationships in Social Networks"; Future Internet, Accepted: Mar. 17, 2017; Published: Mar. 21, 2017.

Frank E. Walter, Stefano Battiston, and Frank Schweitzer, "Personalised and dynamic trust in social networks"; Conference Paper, Jan. 2009, ResearchGate.

Xiaoyong Li, Feng Zhou, and Xudong Yang, "A multi-dimensional trust evaluation model for large-scale P2P computing"; J. Parallel Distrib. Comput. 71 (2011) 837-847.

Xiaoming Zheng, et al., "Modeling the Dynamic Trust of Online Service Providers using HMM", Published in: 2013 IEEE 20th International Conference on Web Services, Date of Conference: Jun. 28-Jul. 3, 2013.

* cited by examiner

METHOD AND SYSTEM FOR DYNAMIC TRUST MODEL FOR PERSONALIZED RECOMMENDATION SYSTEM IN SHARED AND NON-SHARED ECONOMY

TECHNICAL FIELD

Embodiments are generally related to recommendation methods and systems. Embodiments further relate to personalized recommendation systems. Embodiments also relate to trust-based recommendation systems and the collection of invasive and non-invasive data collection techniques.

BACKGROUND

Multiple factors can influence a user in deciding between available options. Current decision-making systems are heuristic in nature, but limited in their approach to modeling trust. Such systems provide some generic, unstructured profile data but leave it to the discretion of the user to finalize his or her user profile. Considering the diverse and dynamic nature of trust, these systems fail to adapt to users' changing trust profiles.

In a ride-sharing context, for example, depending on certain external factors such as the time of day, the availability of other alternatives, sources, destinations, conveniences, etc., the user decides the mode of commute. While most conventional systems provide time and cost effective commute options, the decision making process of whether to trust a particular mode is left to the discretion of the user. This leads to increased time and effort by the user every time a selection is necessary.

A union of available variables influences the decision-making process. Depending on the external factors, users cognitively assign different weights to each of these variables at the time of selection. For example, a user may select a time effective option while commuting to his or her workplace and a cost effective option while commuting back to his or her home from work owing to the 'time of the day' factor. The chances of a user selecting a trusted commute option may increase in instances such as, for example: late night (time of the day), unknown source and/or destination (geography), availability of different commute options, etc. Hence, it is important for an effective recommendation system to categorize information based on a concept of trust along with commonly used time (duration) and cost filters.

Trust is a complicated human behavior developed during humanity's evolution. Depending on circumstances and applications, trust has many different interpretations and, consequently, different representations and management principles.

Trust has been a blazing research topic in many fields, such as psychology, sociology, Information Technology (IT) systems, cognition and so on. For example, trust has been used in electronic markets, such as eBay, in the Internet of Things, and in Peer-to-Peer systems. In such applications, trust can be constructed by algorithms based on observations of usage history, such as positive or negative evidence or feedback. The success of online social networks has encouraged the exploration of new directions for computerized trust representations and management of (cognitive) trust.

Cognitive trust is especially useful in cases where it is difficult for computers to evaluate evidences; however, human trust, especially in large online social communities, such as Facebook, Twitter, Amazon, and so on, requires the support of computer systems.

Due to the large amount of available data in today's information age, it is impossible for users to handle trust as in real life, where people only have a limited number of acquaintances. Conventional trust recommendation systems are limited in their approaches of modeling trust. Drawbacks of conventional trust recommendation systems and related approaches include their heuristic nature. That is, such conventional systems are heuristic nature and also provide only generic, unstructured profile information. It is left to the discretion of the users to finalize a trust recommendation via one profile. In addition, such systems fail to adapt to users' changing trust profiles.

Other problems with conventional systems include the fact that such systems provide time and cost effective commute options, but whether to trust a particular entity or situation is left to the discretion of the users. Thus, increased time and effort from the users' end are necessary every time a selection is necessary. In addition, a union of multiple variables typically influences such decision-making. The users much cognitively assign a different weight to each variable at the time of selection. In addition, user preferences may change depending on external factors such as the time of day, availability of alternatives, familiarity with a source/destination, etc.

Therefore, a need exists for a recommender system that categorizes information based on a trust. I need also exists for a framework that can effectively, but also intuitively, allow people to express their trust and enable a recommendation system to automatically and securely summarize the massive amounts of trust information, so a user of the system can make "educated" decisions or at least not blind decisions. It is also important to provide for recommendations of trust in a fast and efficient manner, particular in computing applications (e.g., ride share applications) requiring increased efficiencies in processing data.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a personalized recommendation method and system.

It is another aspect of the disclosed embodiments to provide for a trust-based dynamic personalized recommendation system that learns user-specific dynamic trust factors.

It is still another aspect of the disclosed embodiments to provide for methods and systems for automatically assessing the trust associated with another person, event, or situation for applications such as, but not limited to, ride sharing applications.

It is yet another aspect of the disclosed embodiments to provide for methods and systems for automatically assessing trust and providing trust recommendations (e.g., via a trust score) in which the user data is categorized even when the user profile changes.

It is also an aspect of the disclosed embodiments to provide for a personalized recommendation method and system that generates a trust score and displays the factors contributing to the contribution of the trust score.

The aforementioned aspects and other objectives and advantages can now be achieved as described herein. Methods and systems are disclosed for personalized trust recommendation based on a dynamic trust model. In one example embodiment, a trust framework can be derived from a set of use-case specific factors. Invasive data and non-invasive data can be collected from a user (or a group of users) based on activity data and profile data associated with the user. A dynamic trust profile can be created (or learned) based on the invasive data and the non-invasive data collected from the user. A recommended level of trustworthiness can be then provided to the user with respect to a particular situation and/or entity (e.g. other users) within the trust framework based on the dynamic trust profile of the user and which is personalized for the user.

In some example embodiments, the aforementioned activity data can include app-usage data associated with the user. In addition, the aforementioned use-case specific factors can include factors such as, for example, demographic information, institutional information, collaboration, emotions, and pervious and repeated interactions with other users.

The disclosed embodiments thus provide for a trust-based dynamic personalized recommendation method system that learns user-specific dynamic trust factors. Through invasive and non-invasive data collection techniques, a trust profile is created for each user. The disclosed embodiments can identify core factors that influence the decision making process of invoking trust. This approach also builds a trust profile that is based on the context.

The aforementioned recommended level of trustworthiness is based on a trust score that can be computed by building a trust framework from a set of use case specific factors, collecting invasive and non-invasive data from a (or users) through app-usage data, profile data etc, and learning the user's dynamic trust profile with respects to the changing context.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
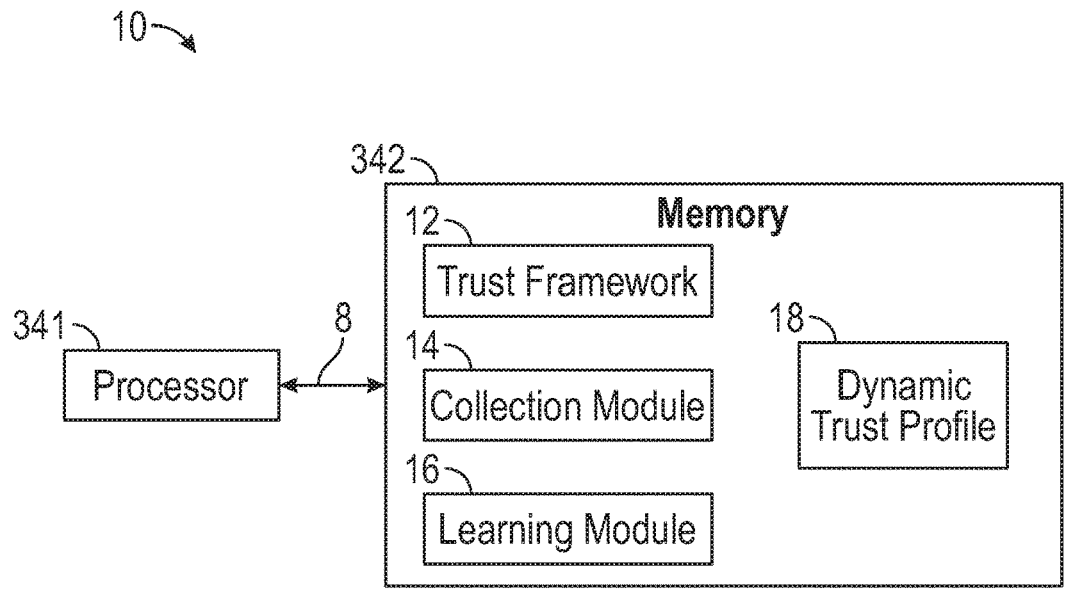
FIG. 1 illustrates a block diagram of a system for personalized trust recommendation based on a dynamic trust model, in accordance with one embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

The term "trust" as utilized herein can be divided into a number of different types as follows:

Institution Based Trust is a dynamic relationship between an individual and an institution. It is a form/sub-type of trust and is distinguished by the potential magnitude of its effect. The relationship can be analyzed through techniques developed for the analysis of interpersonal ties. The form of the relationship may be explicit (or implicit) and internal (or external) to an institution in both perception and reality. The disposition of the relationship can be qualified as positive, neutral or negative. The strength of the relationship is quantifiable through a relative percentage from 0% (weak) to 100% (strong).

Swift Trust is a form of trust that occurs in temporary organizational structures, which can include quick starting groups or teams. Debra Meyerson and her colleagues first explored the concept of "swift trust" in 1996. In swift trust theory, a group or team assumes trust initially, and later verifies and adjusts trust beliefs accordingly.

Knowledge Based Trust is a source that has few false facts is considered to be trustworthy. The facts are automatically extracted from each source by information extraction methods commonly used to construct knowledge.

Relational Trust is a type of trust in which the relational aspect of trust defines trust built up over time as a result of repeated interactions between the trustor and trustee. Information available to the trustor from within the relationship itself forms the basis of relational trust. Reliability and dependability in previous interactions with the trustee give rise to positive expectations about the trustee's intentions.

Identity-Based Trust is the third and most intimate level of trust we experience in relationships. This level of trust means that you know my hopes, dreams, goals, ambitions, fears, and doubts. Identity-based trust is not appropriate for every relationship.

Cognitive Trust is based on the confidence one feels in another person's accomplishments, skills and reliability. This is trust "from the head" so to speak. Affective Trust, on the other hand, arises from feelings of emotional closeness, empathy or friendship.

Note that in the field of psychology, trust can be considered to be a psychological state of the individual, where the trustor risks being vulnerable to the trustee based on positive expectations of the trustee's intentions or behavior. Trust can be considered to have three aspects: cognitive, emotive, and behavioral.

The underlying trust factors can be fall into two categories—Circle Trust and Non-Circle Trust.

Circle Trust: 'Circle' trust categories are layered. Each category has different factors. For instance, the Dispositionar category has different factors such as Age, Gender, and Marital Status etc. The factors have values, which can be preferred by a user. The values, thereby, become the circles. The term "Circle Trust" as utilized herein includes the following categories: Dispositional Trust, Institutional Trust, and Collaborative Trust.

Dispositional Trust recognizes that, over the course of their lives, people develop generalized expectations about the trustworthiness of other people. This can be in the positive direction or can go negative with the experience.

Institutional Trust is trust as a result of an institution providing an environment that encourages cooperation between members. Institution can be school, college, previous workplace, present workplace, etc.

Collaborative Trust is formed through common goals like similar hobbies, pollution and traffic reduction as one goal. Collaborative Trust also includes people's common interests, profession and achievements.

Non-Circle Trust: Non-circle parameters are not layered; the outcome can be mapped into a binary positive or negative. They are discrete, either qualitative (user reviews) or quantitative (user ratings). Non-Circle Trust includes Proactive Trust and Relational Trust.

Proactive Trust depends on the reviews and ratings or the perception of other people about a person. Proactive Trust also depends on emotional and cognitive trust to make a decision. Cognitive Trust is defined as trust based on reason and rational behavior, and emotional trust is perceived to be an outcome of direct interpersonal relationships.

Relational Trust is a relational aspect of trust that defines trust built up over time as a result of repeated interactions between the trustor and trustee. Information available to the trustor from within the relationship itself forms the basis of relational trust. Table 1 below presents an example of the above various types of trust and categories such as age, gender, marital status and so on. It should be appreciated that the information set forth in Table 1 is provided for exemplary purposes only and is not a limiting feature of the disclosed embodiments.

derive from one's own experience and perception of other person. The situational factors are the external factors considered in the case, for example, ridesharing. Examples of such external factors may be the time of the day, the location, etc.

FIG. 1 illustrates a block diagram of a system 10 for personalized trust recommendation based on a dynamic trust model, in accordance with an example embodiment. The system 10 shown in FIG. 1 generally includes a memory 342 and a processor 341. The memory 342 and the processor 342 can communicate with one another via, for example, a system bus or other communications means indicated by arrow in FIG. 1.

Note that the processor 342 can be configured as a processing unit such as an electronic circuit that performs operations on some external data source such as memory 342 or some other data stream. The processor 342 may be, for example, a CPU (Central Processing Unit), but can also in some example embodiments be provided as a specialized processor. Processor 342 can also be a processor such as a GPU (Graphics Processing Unit), a VPU (Video Processing Unit), a VPU (Vision Processing Unit), a TPU (Tensor Processing Unit), an NPU (Neural Processing Unit), a DSP (Digital Signal Processing) Unit, a FPGA (Field-Programmable Gate Array) and so on, or combinations thereof, depending upon design considerations. Processor 342 may also be provided as a microprocessor, a multi-core processor, a front-end processor, and so on.

The memory 342 can be implemented as a device where information can be stored and retrieved. In the most general sense, the term "memory" as utilized herein can refer to

TABLE 1

| Dispositional | Institutional | Collaborative | Cognitive/Emotional | Relational | Platform/App Specific |
| --- | --- | --- | --- | --- | --- |
| Age | Current Workplace | Interests | User Reviews | Previous Interaction | Usage Frequency/Activity Level |
| Gender | Previous Workplace | Hobbies | Number of User Reviews | Repeated Interactions | Profile Verification Level |
| Marital Status | College | Profession | User Ratings | Mutual Connections | Member Since |
| Religion | School | Achievements | Number of User Ratings | | Highest Rated Attribute |
| Hometown | | | | | Profile Picture |
| Nationality | | | | | Activity Content |
| Current Residence | | | | | |
| Locality | | | | | |
| Qualification | | | | | |
| Self Description | | | | | |

A trust framework can be based on the Theory of Reasoned Action as it involves trusting people as an attitude and behavioral norms and external factors as situational factors. Intention involves the sharing of economy and in this case peer-to-peer ride sharing; the stronger the intention, our attitude will become even stronger to perform that action. Norms can be composed of proactive trust wherein we rely on our judgment of others' perception of a person, event, situation, place, etc. For example, we may consider reviews regarding a particular restaurant prior to visiting that establishment. Before visiting the establishment, however, we are in this situation placing our trust in the reviews of the restaurant provided by other people.

Relational, collaborative, individual and dispositional trust falls under a belief or a reasoning as these forms of trust external storage such as disk drives, Flash drives, and so on, but also can refer to semiconductor storage such as RAM (Random Access Memory) directly connected to the processor 341. The memory 342 can also be implemented as, for example, a memory core, EEPROM, EPROM, flash memory, RAM, ROM and so on. Memory 342 can also be implemented in some contexts as mass storage or as a database or a group of databases. The term "memory" as utilized herein can refer to "primary storage" or "main memory" associated with semiconductor memory used as primary storage. The term "memory" can include both volatile and non-volatile memory. Examples of non-volatile memory include the aforementioned Flash memory (used as a second memory) and ROM, PROM, EPROM, EEPROM memory. Examples of volatile memory include primary storage such as DRAM (Dynamic Random-Access Memory) and fast CPU cache memory such as SRAM (Static Random-Access Memory).

System 10 may be, for example, a data-processing system that is a combination of machines and processes that for a set of inputs produces a defined set of outputs. System 10 may also be an information processor that takes information in one form and transports it into another form by an algorithmic process. System 10 can also be an information system composed of people and computers that processes or interprets information. System 10 may be, for example, a computer server, a mobile computing device such as a smartphone or a tablet computing device, a desktop computer, and so on, or combinations thereof.

System 10 is a trust-based dynamic personalized recommendation system that learns user-specific dynamic trust factors. As indicated previously, assessing the trust associated with another person is important if one will be interacting with strangers through an application such as, for example, ride-sharing. Through invasive and non-invasive data collection techniques, the system 10 creates a dynamic trust profile 18 for each user.

This approach identifies the core factors that influence the decision making process of invoking trust. This approach also builds the trust profile 18 based on the context. To facilitate the trust-based dynamic personalized recommendation system 10, at least three basic modules can be stored in memory 342. These modules include a trust framework module 12 (also referred to as simply a "trust framework"), a collection module 14, and a learning module 16.

The modules 12, 14, and 16 can be implemented to compute a trust score by building a trust framework from a set of use case specific factors, collecting invasive and non-invasive data from user(s) through app-usage data, profile data, etc., and learning a user's dynamic trust profile 18 with respect to the changing context. The trust framework module 12 builds the trust framework from the aforementioned set of use case specific factors. The collection module 14 collects the invasive and non-invasive data from the users, and the learning module 16 builds the user's dynamic trust profile 18 from the use case specific factors. The modules 12, 14, 16 and the dynamic trust profile 18 can be processed via the processor 341.

Note that the term "learning" or "learn" as utilized herein (e.g., as in the learning module 16) can refer in some example embodiments to machine learning. "Machine learning" refers to a machine's ability to learn without being programmed. The machine learning allows a machine to automatically analyze data and build analytical model. Machine learning uses various algorithms that iteratively learn from data. The machine learning allows machine to determine hidden insights without being explicitly programmed. For example, through machine learning, the machine may itself analyze connections between various users through their social media websites (e.g., connections) and may generate relation between users. The relationship between users may be direct or one-to-one or may be indirect, e.g., through one or more common connections. Through machine learning, the machine may be able to determine the direct and indirect relation between users by analyzing their social media websites and connections.

Figure 2:
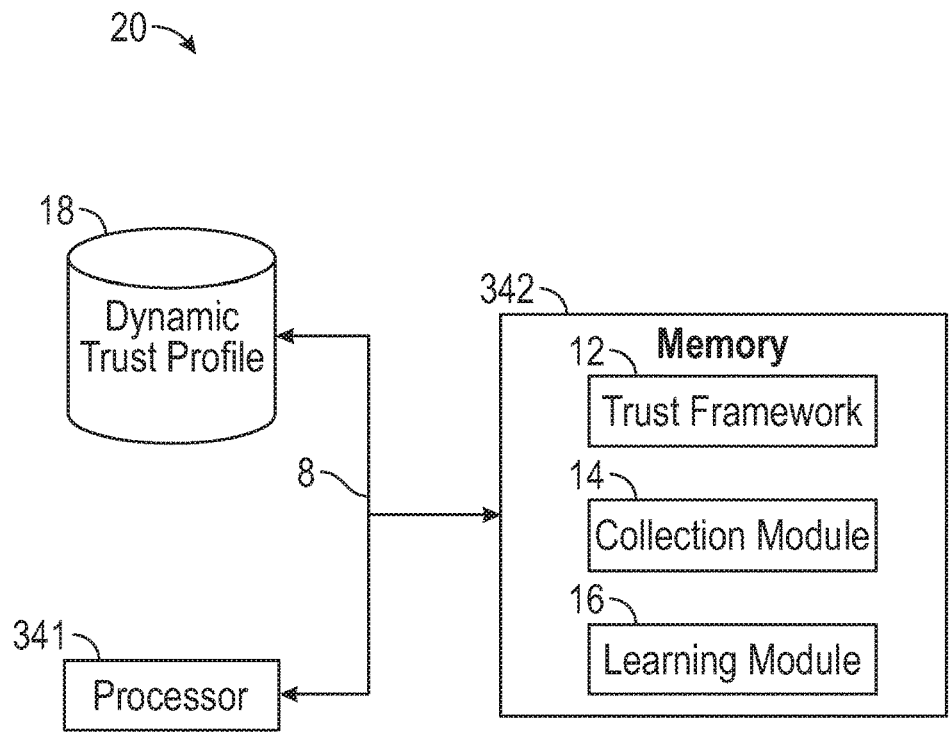
FIG. 2 illustrates a block diagram of a system for personalized trust recommendation based on a dynamic trust model, in accordance with an alternative embodiment.

FIG. 2 illustrates a block diagram of a system 20 for personalized trust recommendation based on a dynamic trust model, in accordance with another example embodiment. Note that in FIGS. 1-2 and in the other figures herein, identical or similar parts or elements are generally indicated by identical reference numerals. The system may be, for example a data-processing system such as a computer. In the configuration shown in FIG. 2, the dynamic trust profile 18 can be maintained with a database external to the memory 342. That is, the database that contains the dynamic trust profile may be located in another memory (e.g., in another computer, a remote computer server, etc). The embodiment shown in FIG. 2 is an alternative version of the embodiment shown in FIG. 1.

The trust framework 12 can be understood in the context of the Theory of Reasoned Action Trust, which is a persuasive behavior model underlying the basis of the disclosed trust framework. The theory of reasoned action (TRA) is one classic models of persuasion. The theory of reasoned action was developed by Martin Fishbein and Icek Ajzen in 1967 and was derived from previous research that began as the theory of attitude. The theory aims to explain the relationship between attitudes and behaviors within human action, TRA can be used to predict how individuals will behave based on their pre-existing attitudes and behavioral intentions. An individual's decision to engage in a particular behavior is based on the outcomes the individual expects will come as a result of performing the behavior.

The theory of reasoned action serves to understand an individual's voluntary behavior. The ideas found within the theory of reasoned action have to do with an individual's basic motivation to perform an action. The theory of reasoned action suggests that stronger intentions lead to increased effort to perform the behavior, which also increases the likelihood for the behavior to be performed. The Theory of Reasoned Action has three factors: attitude, norm and situational factors.

Figure 3:
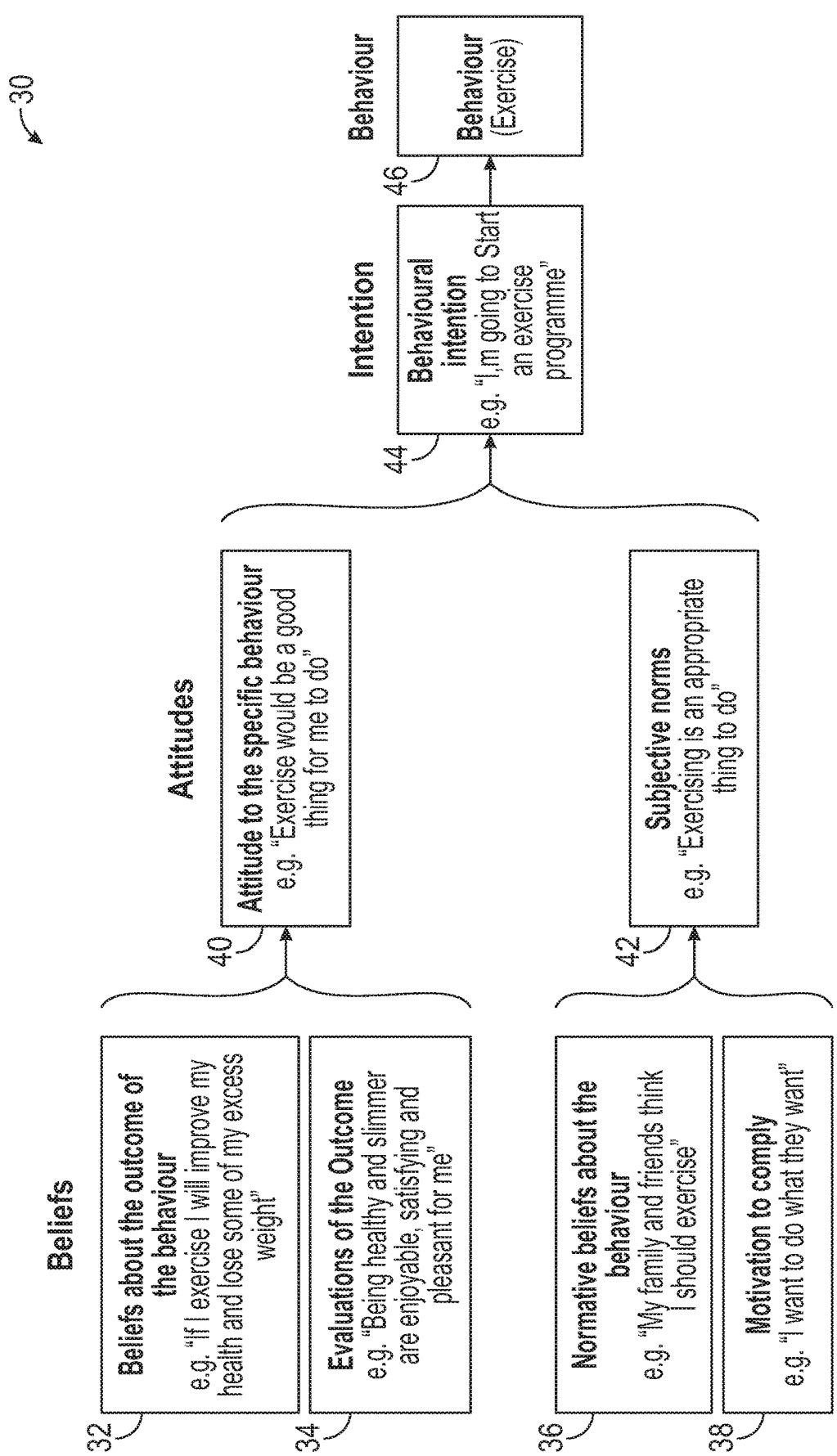
FIG. 3 illustrates a flow diagram depicting an example method that follows the Theory of Reasoned Action, in accordance with an example embodiment.

FIG. 3 illustrates a flow diagram depicting a method 30 that implements the Theory of Reasoned Action, in accordance with an example embodiment. As shown at block 32, beliefs about the outcome of a behavior (e.g. "If I exercise, I will improve my health, and lost some of my excess rates) and as indicated at block 34, evaluations of the outcome (e.g., "being healthy and slimmer are enjoyable, satisfying and pleasant for me") result in or facilitate an attitude toward the specific behavior ("e.g., exercise would be a good thing for me to do") as shown as block 40. As indicated at block 36, normative beliefs about the behavior (e.g., "my family and friends think I should exercise") along with the motivation to comply (e.g., "I want do what they want") as shown at block 38 contribute to subjective norms (e.g., "exercising is an appropriate thing to do") as illustrated at block 42. The behavioral intention (e.g., "I'm going to start an exercise program") as shown at block 44 is followed (hopefully) by the actual behavior (e.g. exercise) as illustrated at block 46.

Figure 4:
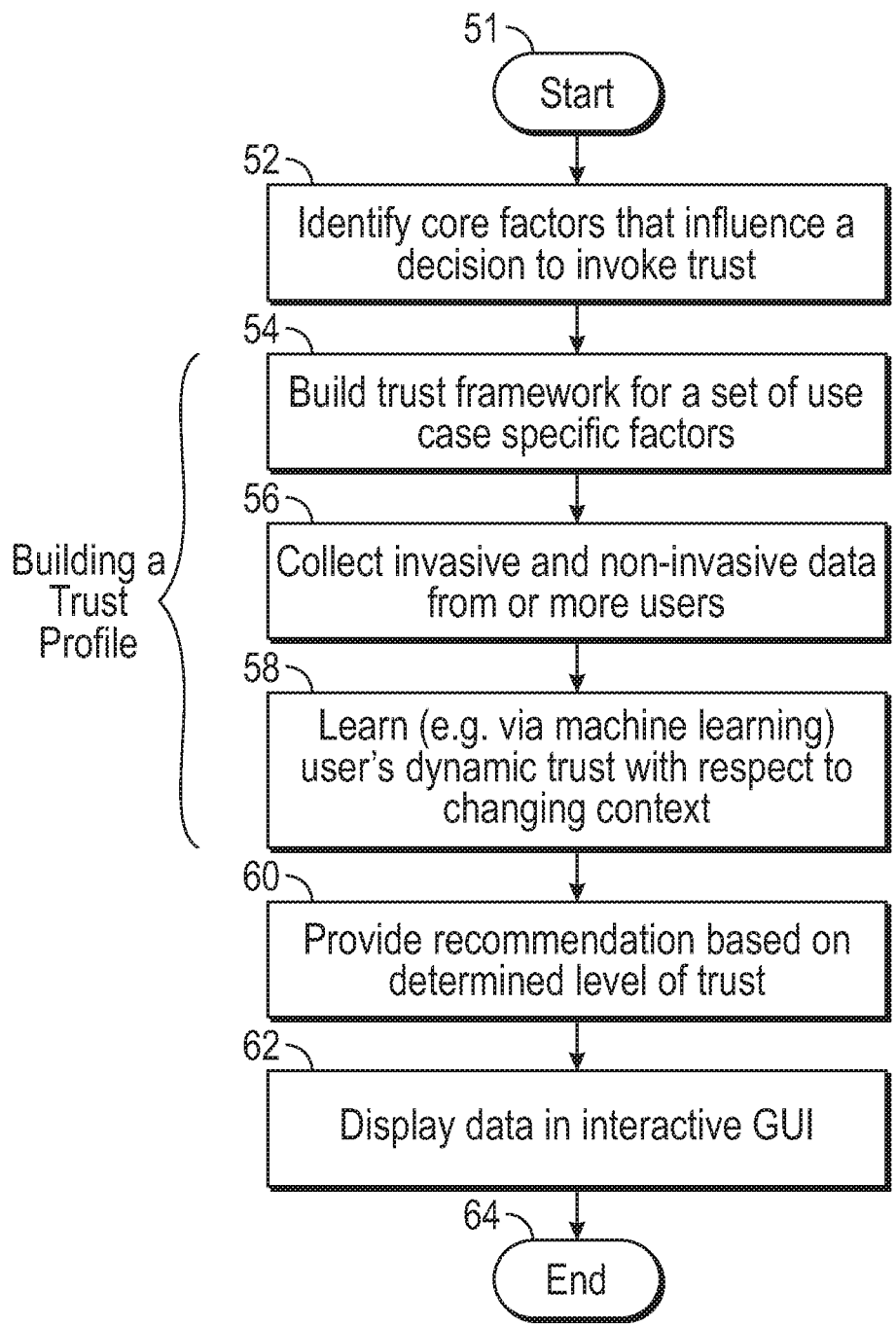
FIG. 4 illustrates a flow chart of operations depicting logical operational steps of a method for implementing a dynamic trust model for a personalized recommendation system, in accordance with an example embodiment.

FIG. 4 illustrates a flow chart of operations depicting logical operational steps of a method 50 for implementing a dynamic trust model for a personalized recommendation system, in accordance with an example embodiment. This dynamic trust model can be based on an existing human psychology theory (e.g., such as the Theory of Reasoned Action Trust) and modified through experimentation to derive the disclosed trust framework. Note that an example of an experimentation that can be utilized to derive a trust framework is discussed in further detail below (i.e., see the discussion herein regarding an example card sorting activity).

The method 50 shown in FIG. 4 can be implemented to provide for a trust-based dynamic personalized recommendation system (e.g., such as the systems 10, 20) that learns user-specific dynamic trust factors. As discussed previously, assessing the trust associated with another person, event or situation is important when interacting with strangers through an application such as, for example, a ride-sharing application, Through invasive and non-invasive data collection techniques as discussed herein, a trust profile can be created for each user.

As shown at block 51 in FIG. 4, the process begins. As depicted next at block 52, a step, operation or instruction can be implemented to identify the core factors that influence a decision to invoke trust. Examples of such core factors have been described previously herein. A trust profile can be then built based on the context of a particular person, situation, event etc., as indicated at blocks 54, 56, and 58. That is, contextual bandits can be modeled, wherein the set of actions is infinite and only a subset of the actions is available in a trial. The bandit pulls several arms in a trial in a ranked order and estimates the rank while considering the diversity of the actions. The 'learning' aspect of the learning step, operation or instruction depicted at block 58 can be implemented via machine learning (see the prior definition of machine learning herein).

Note that the term "contextual bandits" refers to a class of algorithms that can arise or used in the context of personalization of user experience. For example, if one develops a personalization of user experience for a website or an app (e.g., a mobile software application), contextual bandits can assist in this goal. Using contextual bandits, one can choose which content to display to a user, along with rank advertisements, optimized search results, and selecting the best image to display on a page, and so on. A variety of different terms have been used to refer to this particular class of algorithms including, but not limited to terms such as contextual bandits, multi-world testing, associative bandits, learning with partial feedback, learning with bandit feedback, bandits with side information, multi-class classification with bandit feedback, associative reinforcement learning, and one-step reinforcement learning.

As shown at block 54, a step, operation or instruction can be implemented to build a trust framework (e.g., such as described previously herein) from a set of use case specific factors. As discussed previously the trust framework is based on factors such as demographic information, institutions, collaboration, emotions and pervious and repeated interactions with other users/entities on the platform, etc.

As indicated next at block 56, a step, operation or instruction can be implemented to collect invasive and non-invasive data from a user (or a group of users) through activities such as, for example, app-usage data, profile data, and so on. Then, as described at block 58, a step, operation or instruction can be implemented to learn the user's (or users') dynamic trust profile with respect to the changing context.

Thereafter, as depicted at block 60, a step, operation or instruction can be implemented to provide for a recommendation to a user based on the determined level of trust. The recommendations are sorted and presented based on trust scores (e.g., a level of trust) that represent the trustworthiness of an entity while maintaining the diversity of the relevant items for the user. The operation shown at block 60 involves a step or operation in which given a context, trust scores are calculated for each candidate item based on the learned user trust profile.

The presentation of the recommendation (or recommendations) to the user (or users) can occur through a GUI (Graphical User Interface), as shown at block 62. That is, such recommendations along with other data can be presented to the user through the GUI. Note that in some example embodiments, the aforementioned diversity in the candidate items can be found and the resulting recommendations presented to the user via the GUI in a manner in which the diversity is maintained. The process then ends, as shown at block 64.

It can be appreciated that the disclosed method and system offers a number of advantages and features. For example, the aforementioned GUI can be configured to present a personalized trust score for each recommendation to user(s) based on their previous preferences. The disclosed approach provides a justification of calculating the personalized trust score. In addition, external factors that influenced the prioritizing of core and use-case specific factors can be highlighted or emphasized, resulting in a set of contextual factors. This approach also highlights or emphasizes all contextual core and use-case specific factor values upon which the recommendation was derived. This information can be displayed in the aforementioned GUI.

The disclosed method and system also provides justification for showing the highlighted contextual factor values. In addition, the identified categories of trust can be translated in the form of tabs, wherein different tabs display the factors and their values in each category. The ordering of the tabs in the user interface will be based on users' history of preferences. Once the user confirms an entity (e.g., confirmation can be provided by the user through the GUI), the system can prompt a user to select factors that influenced the decision-making. The GUI can also be configured with a user profile section. In the user profile section, the preferred factor values can be displayed in the form of tags.

As discussed previously, various experiments can be employed to derive the trust framework. One possible experiment involves a card sorting activity. A card sorting activity can be performed to close on the exhaustive set of core factors. Prior to the activity, an initial set of peer-to-peer core trust factors can be listed using heuristics. A set of context specific factors and external factors pertaining to ride sharing, for example, (a peer-to-peer scenario) can also be identified. Once a near exhaustive set of factors is identified, a pilot closed card sorting exercise can be performed to finalize the experiment protocol. From a pilot experimentation, it will be evident that certain factors do not fall in the predefined categories (e.g., Dispositional, Institutional, Collaborative, Cognitive/Emotional, Relational). This can lead to the necessity of performing open card sorting.

A final activity can be implemented to offer a set of open card sorting exercises, wherein users have the flexibility to define new categories as well as new core, context specific and/or external factors. A potential protocol for open card sorting is as follows:
1. Introduce to users, the cards, as factors that help in building trust. Explain factors if required.
2. Ask users to group the cards, which appear similar, create as many groups.
3. Ask users to order the different groups formed, according to their own perception of trusting an entity.
4. Ask users to sort cards (highest to least priority) within each group.
5. Seek explanation for grouping and sorting from users.
6. Add new factors to the list, if any.

A potential protocol for closed card sorting is as follows:
1. Introduce to users, the categories and provide the factors separately. Explain factors if required.
2. Ask users to arrange the cards under any desired category, create new category if required.
3. Ask users to order the different categories formed, according to their own perception of trusting an entity.
4. Ask users to sort cards (highest to least priority) within each category.
5. Seek explanation for grouping and sorting from users.
6. Add new factors or category to the list, if any.

As the sorting pattern of users begins matching across users over time, closed card sorting exercises can be performed to validate the previous outcome. The card sorting activity can result in inclusion of another category, termed as Platform/App Specific Information. This category can include factors such as Profile Picture, Member Since, Profile Verification Level, Self-Description, and Activity Level/Usage Frequency etc. A similar activity can be performed to identify an exhaustive set of business-to-business or business-to-customer core and context specific trust factors and can thus be extended in the realm of non-shared economy domain.

A final set of factors identified from an actual experience is shown in the tables below:

TABLE 2

| | | | Initial Set of Trust Factors | | |
|---|---|---|---|---|---|
| Age | Gender | Marital Status | Religion | Hometown | Current Residence Locality |
| Hobbies | Interests | Achievements | Qualification | Profession | Repeated Interactions |
| Previous Workplace | Current Workplace | College | School | Previous Interaction | |
| User Reviews | Number of User Reviews | User Ratings | Activity Level | Usage Frequency | Mutual Connections |
| Profile Picture | Profile Verification Level | Member Since | Highest Rated Attribute | | |

TABLE 3

| | User Identified Trust Factor | |
|---|---|---|
| Self Description | Nationality | Activity Content |

Some of the other user identified factors were not included in the list because it would be either difficult to frame questions during profiling that could induce bias. Some of these factors may include, for example, orientation, race, political inclination, profanity, etc. Usage Frequency and Activity Level may be perceived as the same, although these factors can be utilized to identify overall feature usage and any other activity in the platform respectively. In the final set of factors, they were merged.

TABLE 4

| | | | Final Set of Core Factors | | |
|---|---|---|---|---|---|
| Dispositional | Institutional | Collaborative | Cognitive/Emotional | Relational | Platform/App Specific |
| Age | Current Workplace | Interests | User Reviews | Previous Interaction | Usage Frequency/ Activity Level |
| Gender | Previous Workplace | Hobbies | Number of User Reviews | Repeated Interactions | Profile Verification Level |
| Marital Status | College | Profession | User Ratings | Mutual Connections | Member Since |
| Religion | School | Achievements | Number of User Ratings | | Highest Rated Attribute |
| Hometown | | | | | Profile Picture |
| Nationality | | | | | Activity Content |
| Current Residence Locality | | | | | |
| Qualification | | | | | |
| Self Description | | | | | |

TABLE 5

| Context Specific Factors (for Ride Sharing) | | | | | |
|---|---|---|---|---|---|
| Initial Set: | | | | | |
| Vehicle Type | Vehicle Model | Car Type | Travel Duration | Source | Destination |
| Co-passenger info | Number of Co-passengers | Number of seats offered | Walking time/distance to pick-up point | Walking time/distance from drop-off point | Number of stops |
| Punctuality | Pickup/drop-off detour | Payment method | Total rides offered | Total rides taken | Trip types |
| User Identified: | | | | | |
| Driving Skills | Travel Context | Attire | Travel Distance | Travel Route | |
| Familiarity with Source | Familiarity with Destination | | | | |

TABLE 5-continued

Context Specific Factors (for Ride Sharing)

External Factors (for Ride Sharing):

| Time of Day | Geography | Availability of Alternates | Cost of Alternates | State of Mind | Weather |
|---|---|---|---|---|---|
| Social Obligation | Current Financial State | Weather | Cost | | |

Four non-limiting possible scenarios are described below to illustrate practical applications of the disclosed embodiments.

Scenario 1—

Arya has moved to a new city and has realized in a few days that transport options available to her are limited and expensive. She heard about the concept of ride sharing from her colleagues and decided to try it out. New to this app, she had not set her preferences. The system then suggested trips based on preferences set by other users, which would match Arya's demographics.

Scenario 2:

Puja travels a distance of 14 kilometers everyday to office. With very little public transport options available around her locality, where she recently moved to, she prefers to take a sharing cab to save costs over private commuting options. Her commute time ranges from 8 am to 9 am while going to office and 5-6 pm while coming back. The system has learned over time that Puja selects options that require no/minimum walking in the morning and people who are working in the same tech park. But on her way back, when she leaves on time, Puja does not commute with people from same office. However, post 8 pm, if she looks for a sharing option, she prefers traveling with employees from the same company, or from her hometown.

Scenario 3:

Neha works in the marketing domain as a sales professional. Her work hours are erratic and include attending social events such as product launches and success celebrations. She often has to travel to unknown destinations to attend these late evening events. Neha prefers to use the ride sharing option as they are generally easily available and save up on a huge amount of cost. Whenever it is a new destination at night, she prefers traveling with women co-riders. Her preferences also include aged men or women and female drivers. Over the time the system has learned to suggest rides based on destination and time. So now when Neha has to travel to a destination which does not show up in the systems history, the application suggests rides which include female co-riders/aged men or women and or female drivers.

Scenario 4:

Prasad has been working in the sales department of a technical support company since the past few years. His role primarily comprises of arranging meeting with clients and finalizing the contract. His office is situated in a Tech Park, which includes many other IT companies along with BPOs. Post office hours, he tends to visit his clients' place of businesses to regularly check on the services provided by them. During such travels he prefers to opt for the ride sharing facility. Over the time he has learned that many employees from the tech park use this facility too. This journey then provides an opportunity for him to strike a conversation and possibly promote his products and services. So one of his main preferences include that his co-riders are working at these companies. Based on the combination of his timing and co-rider preference, the system now suggests trips, which have one or more co-riders who are working at these companies.

Several non-sharing economy example scenarios are also discussed below as follows:

Selective Information Access:

A supplier in a Procure-to-Pay network is planning to put up a revised price list of a set of items. The supplier does not want to make the prices public, and wants to expose it to certain stakeholders on the network. At the same time, the supplier wants to make sure that no potential buyers are left out. The recommendation system has learned over time the business patterns of the supplier and suggests a set of stakeholders the supplier can expose the data to. At a later point in time, when a new stakeholder requests for an access to the data, the system provides a trust score which helps the supplier take an informed decision.

B2B Collaboration:

A manufacturing company has recently received a contract request over a business collaboration platform from a start-up turned organization that sells smart closets. The collaboration would lead to huge transaction amounts and timed deliveries over a period of five years. While the offer is lucrative, they know very little about the company. The platform has learned over time, the collaboration patterns of the manufacturing company and that the companies involved have certain common attributes such as Span of Control, Chain of Command, Work Specialization, R&D activities, Current Market Worth and CSR activities. Based on these factors, the system disclosed herein can calculate a collaboration compatibility score for the requesting company that helps the manufacturing company assesses the contract request.

Shared Accommodation Scenario:

Nikhil lives at the heart of Mumbai city and is an avid traveler and "foodie". He likes to interact with people from different countries and ethnicities and during his travels takes a keen interest in cooking and exploring local cuisines. He had extensively travelled during his student days and knows how difficult and costly it can be for young travelers to find a budget accommodation option. He has shared his place on a peer-to-peer short-term lodging and hospitality services website. He prefers to rent it out to students, with an average age of 20 to 30 and has either travelling or food exploration as a hobby. He generally prefers people who have 'Social' as the top rated attribute. During festive seasons in Mumbai, Nikhil generally receives a lot of stay requests on the website. The system having learned Nikhil's preferences over time recommends travelers by projecting a trust score for each request taking into consideration his preferred criteria and helps him select someone without him having to scan through all the requests.

As can be appreciated by one skilled in the art, example embodiments can be implemented in the context of a method, data processing system, or computer program product. Accordingly, some embodiments may take the form of an entirely hardware embodiment, an entirely software embodiment or an embodiment combining software and hardware aspects all generally referred to herein as a "circuit" or a "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, and so on.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

Examples of computer software applications or "apps" (e.g., mobile "apps") in which the disclosed embodiments include, for example, ride sharing applications (e.g., Lyft, Uber, Go Bengaluru, etc), blockchain applications, customer experience applications, CAS 2.0, and personalization and HR (Human Resources) "apps" to name a few.

The disclosed approach for providing trust-based personalized recommendations leverages user information and the features associated with the item to be shared to build a match between the user's trust profile and the set of available candidate items to be shared.

User information may pertain to a plurality of features including the user's demographic information, the user's historical behavior and factors determining trust in the sharing economy under consideration. In addition, item information pertaining to a plurality of features that describe the item to be shared may be obtained. In the rest of the section, the method has been discussed with respect to the use case of ride sharing. The method thereby uses the information about the user and the information about the available rides to recommend the most trustworthy rides to the user. The features that describe the user and the ride have been extracted from the trust framework (e.g., such as the trust framework 12) as discussed in previous sections herein.

For instance, the feature vector that describes the user can include categorical features from the user's demographic information and aggregated user's historical behavior with respect to his or her choice of rides. Similarly, the feature vector describing the ride includes aggregated features describing the ride, the ride owner and the co-passengers (in the case of a ride-sharing situation). The disclosed approach uses a reinforcement learning approach where the agent/learner recommends rides to the user and learns the user's trust profile from the user feedback such as implemented via the learning module 16 discussed earlier. The learned trust profile can be then used, for example, for making better recommendations in the future for the same user or similar users.

The disclosed approach thus can model trust based personalized recommendation of, for example, shared rides as a contextual bandit problem, a principled approach in which a learning algorithm sequentially selects rides to serve users based on contextual information about the users and the rides, while simultaneously adapting its ride-selection strategy based on user feedback to maximize user engagement and satisfaction by recommending the most trustworthy rides.

In this section, we define the K-armed contextual bandit problem formally, and further, show how it can model the personalized ride recommendation problem.

A Contextual Multi-Armed Bandit Formulation

The problem of personalized ride recommendation can be naturally modeled as a multi-armed bandit problem with context information. Formally, a contextual-bandit algorithm A can proceed in discrete trials t=1, 2, 3, . . . In trial t, the algorithm observes the current user u(t) and a set A(t) of arms or actions together with their feature vectors x(t,a) for a∈A(t). The vector x(t,a) summarizes information of both the user u(t) and arm a, and will be referred to as the context.

Based on observed payoffs in previous trials, A chooses an arm a(t)∈A(t), and receives payoff r(t,a) whose expectation depends on both the user and the arm. The algorithm can then improve its arm-selection strategy with the new observation. It is important to emphasize here that no feedback is observed for unselected arms.

In the context of ride recommendation, we may view available rides in the pool as arms. When a presented ride is taken/clicked, a payoff of 1 is incurred; otherwise, the payoff is 0. The expected payoff of a ride represents the probability that the ride would be preferred, trusted and eventually taken by the user. Let us term the expected payoff of a ride as its click through rate (CTR), and choosing a ride with maximum CTR is equivalent to maximizing the expected number of clicks from users, which in turn is the same as maximizing the total expected payoff in our bandit formulation.

In the current scenario, apart from the observed expected payoff for each arm, we also have access to user information and the information about the rides which can be used to infer a user's trust profile and subsequently choose rides that are probably most trustworthy to her. For example, it may be much more likely for a woman to be interested in sharing a ride with a female as opposed to a male and a co-worker as opposed to a stranger.

Therefore, we can represent users and rides by a set of informative features that describe them in a compact manner. By doing so, a bandit algorithm can generalize CTR information from one ride/user to another, and learn to choose good rides more quickly, especially for new users and new rides. This facilitates the transfer of learning from one user/ride to another user/ride thereby making the process of learning faster which is of critical importance in any online/web-based system that demands fast response against a dynamically changing pool of content.

One example of an algorithm that can be employed in accordance with one or more embodiments is the LinUCB algorithm. It should be appreciated that this particular algorithm is not a limiting feature of the disclosed embodiments but is discussed herein for exemplary purpose only.

At each step, a linear regression can be run with the data that collected so far to estimate the weights for the features that summarize the context. We then observe our new context (in this case the information about the user and the rides), and use our linear model to generate expected payoff for each arm/ride. We also compute a confidence interval for that predicted payoff for each of the arms. We then choose the arm with the highest upper confidence bound.

To explain the details of such an algorithm, a few definitions as follows can be considered:

d is the number of features that summarize the context (user and ride information)

m is the number of observations (in this case different recommendation trials).

$D_a$ is the m×d design matrix containing observations for arm a.

$c_a$ is the vector of length m for arm a containing 1 if someone clicked and 0 otherwise.

$\hat{\theta}^A$, is the vector of length d of coefficients we obtain from applying ridge regression.

$x_{t,a}$ is a vector of length d and is the context for arm a at time t.

$r_t$ is the payoff (ride taken or not) we observe after we choose an arm in time t.

The arm selected at each time can be determined by calculating which arm provides the largest predicted payoff from a ridge regression for the currently observed context plus a times the standard deviation of the expected payoff. This statement is mathematically represented as follows:

$$a_t = \mathrm{argmax}_{a \in A_t} \left( x_{t,a}^T \hat{\theta}_a + \alpha \sqrt{x_{t,a}^T A_a^{-1} x_{t,a}} \right)$$

where $x_{t,a}^T \hat{\theta}_a$ represents a predicted payoff and $\alpha \sqrt{x_{t,a}^T} A_a^{-1} x_{t,a}$ represents a standard deviation of payoff.

In the standard linUCB for disjoint linear models algorithm, it is assumed that the expected payoff of an arm a is linear in its d-dimensional context with some unknown coefficient vector $\theta_a$ for all t as defined in Equation 1 below.

$$E[r_{t,a}|x_{t,a}] = x_{t,a}^T \theta_a^* \quad (1)$$

In many applications including, it may be helpful to use features that are shared by all arms, in addition to the arm-specific ones. For example, in a ride recommendation, a ride seeker may prefer only rides that offer the ride owner who shares the same demographics with the ride seeker. Hence, it is helpful to offer features that provide both shared and non-shared components. Eventually, we adopt the hybrid linUCB model by adding another linear term to the right-hand side of Equation 1 as follows:

$$E[r_{t,a}|x_{t,a}] = z_{t,a}^T \beta^* + x_{t,a}^T \theta_a^* \quad (2)$$

Given Equation 2, which estimates the expected payoff for an arm in some context and the corresponding confidence interval for the expected payoff in a hybrid linear model setting, an algorithm for recommending rides can proceed as follows.

Pseudo Algorithm:

Step 1: Set the parameter $\alpha$.

Step 2: Loop through every time instant t in the time period T and do the following:
1) Observe the context $x_t$ (the user and the available rides).
2) Loop through each arm(ride) doing this:
   a) Predict the expected payoff for arm a given the context $x_t$.
   b) Estimate the confidence interval for the predicted payoff for arm a given the context $x_t$
3) End the arm loop.
4) Choose the arm with the highest upper confidence bound (break ties by picking at random). The chosen arm(ride) will be recommended as the most trustworthy ride to the user.
5) Observe whether or not the user has taken (or clicked) the recommended ride as the reward $r_t$ and update the parameters of the linear model accordingly.

Step 3: End the time period loop.

Figure 5:
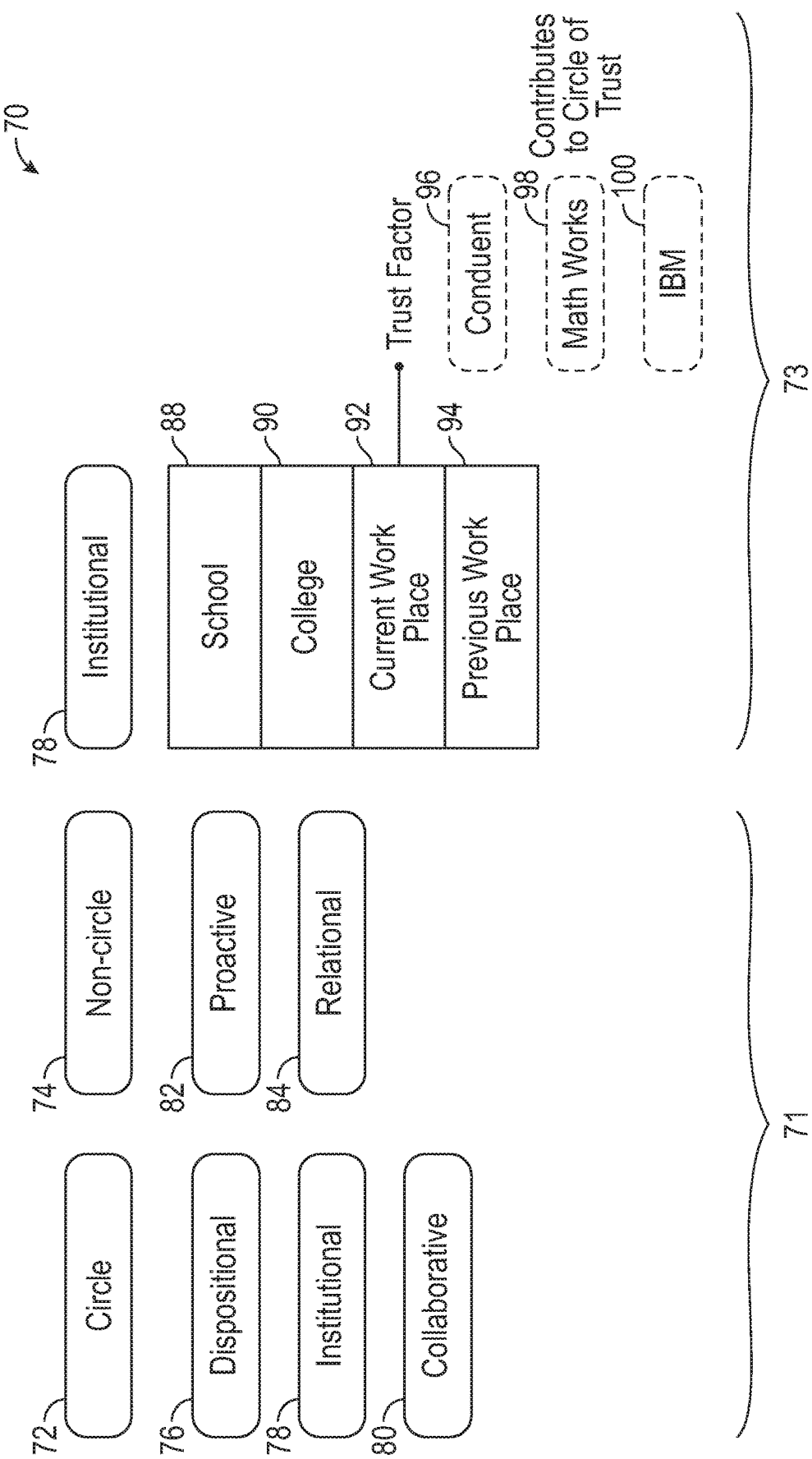
FIG. 5 illustrates a block diagram of a system that provides for a categorization of trust, in accordance with an example embodiment.

FIG. 5 illustrates a block diagram of a system 70 that provides for a categorization of trust, in accordance with alternative example embodiment. The system 70, which provides recommendations based on trust, is an alternative version of the previously described recommendation systems. System 70 provides recommendations based on trust and can be divided into two general sections 71 and 72. The personalized recommendations are based on a dynamic trust model.

The system 70 illustrates a breakdown of trust categorization. Categorization of trust in the context of system 70 includes, for example, a circle trust 72 in which 'circle' trust parameters are layered. Each parameter has different factors. For instance the 'dispositional' parameter 76 has different factors such as, for example, age, gender, ethnicity, etc.

The factors have values, which can be preferred by a user. The values, thereby, become the circles. The non-circle 74 includes non-circle parameters that are no layered, with the outcome mapped into a binary positive or negative. They are discrete, either qualitative (e.g., user reviews) or quantitative (e.g., user ratings). Thus, examples of circle trust parameters include the dispositional parameter 76, the institutional parameters 78, and the collaborative parameter 80. Non-circle parameters include, for example, proactive parameters 82 and relational parameters 84.

Figure 6:
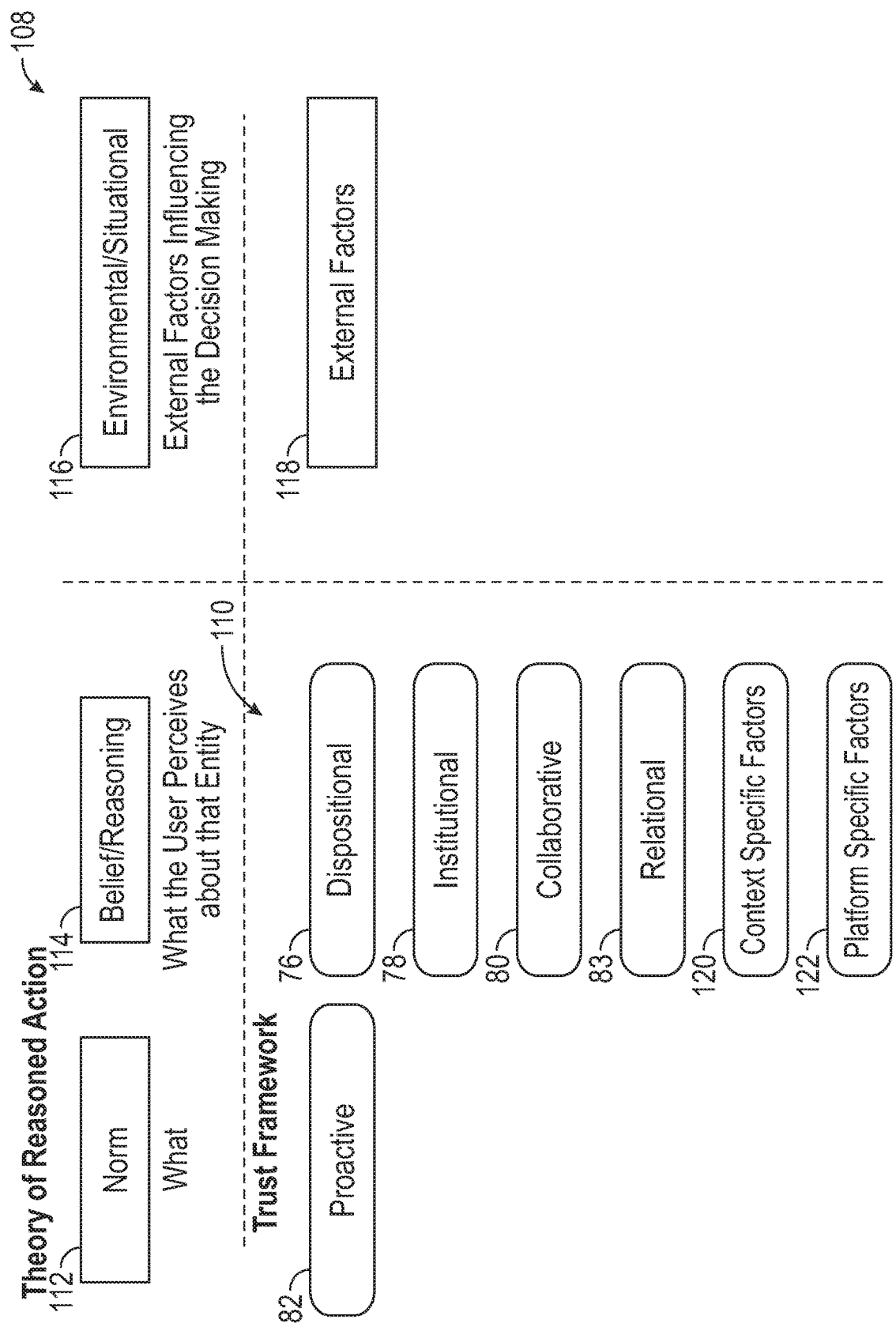
FIG. 6 illustrates a block diagram of an example trust framework that involves translating the underlying theory of reasoned action into the trust framework, in accordance with an example embodiment.

The categorization of system 70 can be further broken down into institutional trust parameters 86 such as, for example, school 88, college 90, current work place 92, and previous work place 94. Examples of contributions to the circle of trust include additional factors 96, 98, and 90, FIG. 6 illustrates a block diagram of an example trust framework 110 that involves translating the underlying theory of reasoned action into the trust framework, in accordance with another example embodiment. In the example shown in FIG. 5, the theory of reasoned action is generally indicated by section 108, which includes a block 112 representing "norm" factors (e.g., what others perceive about the entity), a block 114 representing belief/reasoning factors (e.g., what the user perceives about that entity), and a block 108 representing environmental/situational factors (e.g., external factors influencing the decision-making).

The trust framework 110 includes proactive trust factors 82, dispositional trust factors 76, institutional trust factors 78, collaborative trust factors 80, relational trust factors 83, context specific trust factors 120, and platform specific trust factors 122. The trust framework 110 structures trust based on factors such as demographic information, institutions, collaboration, and previous and repeated interactions with other users/entities on a particular platform (e.g., such as a ride-sharing application).

Figure 7:
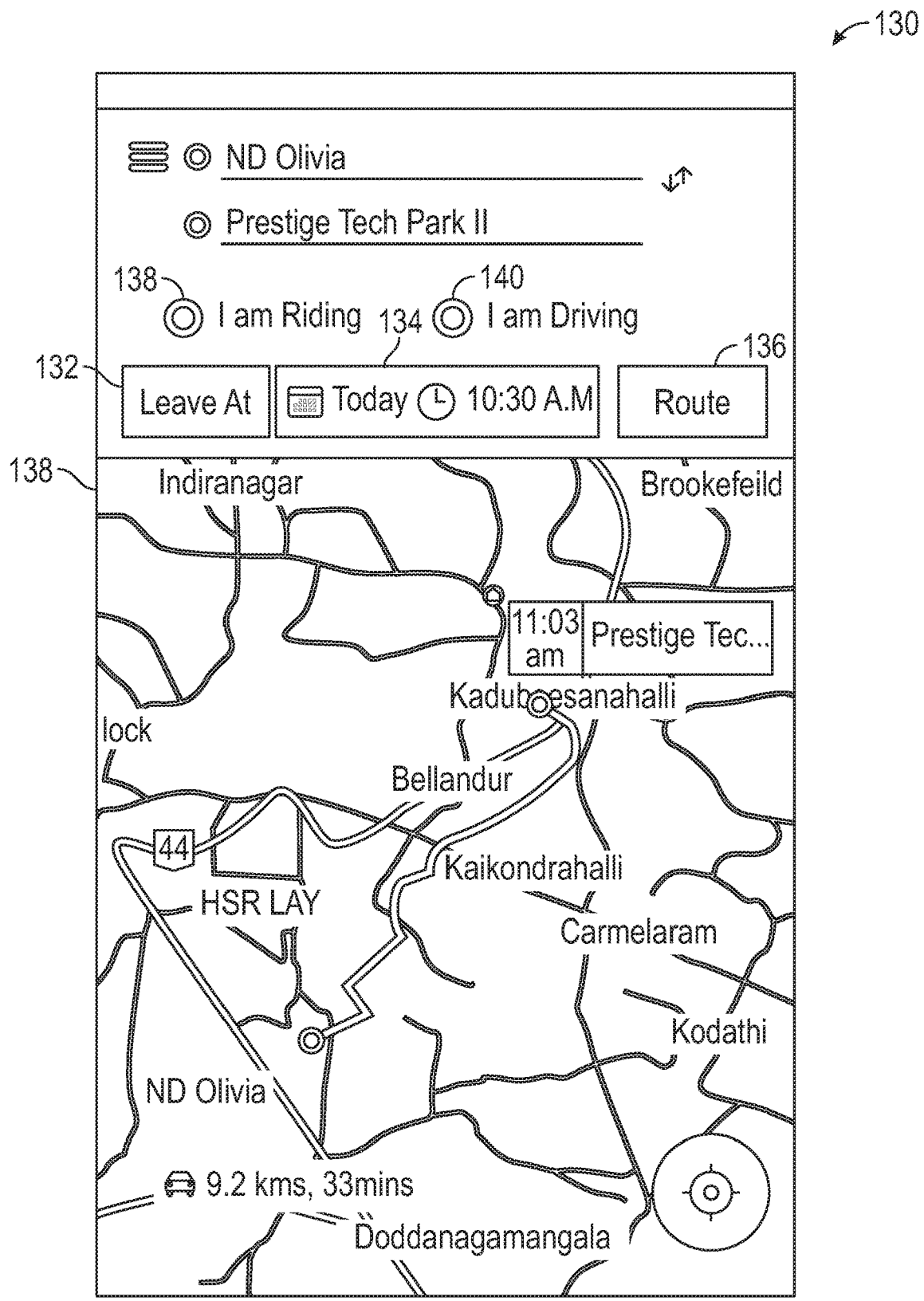
FIG. 7 illustrates a screenshot of a GUI in which a ride seeker inputs his or her source, destination, and time of travel information to view all ride-sharing options, in accordance with an example embodiment.

FIG. 7 illustrates a screenshot of a GUI 130 in which a ride seeker inputs his or her source, destination, and time of travel information to view all ride-sharing options, in accordance with an example embodiment. FIGS. 7-14 illustrate an example sequence of screen images of a GUI for an electronic device. These example images demonstrate one possible screen flow of an interactive GUI, which can be provided via an "app" and displayed via, for example, an electronic device such as a data-processing system (e.g., a smartphone, a table computing device, a laptop computer, a desktop computer, and so on). The disclosed GUI provides a user with the ability to, for example, manipulate items and information displayed on, for example, a touch screen display.

Note that the term "app" as utilized herein can refer to a "mobile app". An "app" is computer software, or a program, most commonly a small, specific one used for mobile devices. The term "app" originally referred to any mobile or desktop application, but as more app stores have emerged to sell mobile apps to smartphone and tablet users, the term has evolved to refer to small programs that can be downloaded and installed all at once. The term "app" can refer, however, to both "mobile apps" and software applications utilized on devices such as laptop computers and desktop computers.

The GUI screen 130 shown in FIG. 7 displays a number of GUI options for a user (e.g., a ride seeker). These options can include a graphically displayed map 138 that shows, for example, an originating location (e.g., ND Olivia) and a destination (e.g., Prestige Tech Park II). A ride seeker can be thus input his or her source, destination, time of travel, and so on, to view all ride-sharing options. For example, the graphically displayed radio button 138 when selected indicates that the user will be riding (not driving), and the radio button 140 when selected indicates that user will actually be the driver. Graphically displayed button 132 allows the user to select the time he or she will leave and button 134 offers graphically displayed options by date and time. The graphically displayed button 136 when selected by a user allows the user to input or select the actual route that he or she intends to take.

Figure 8:
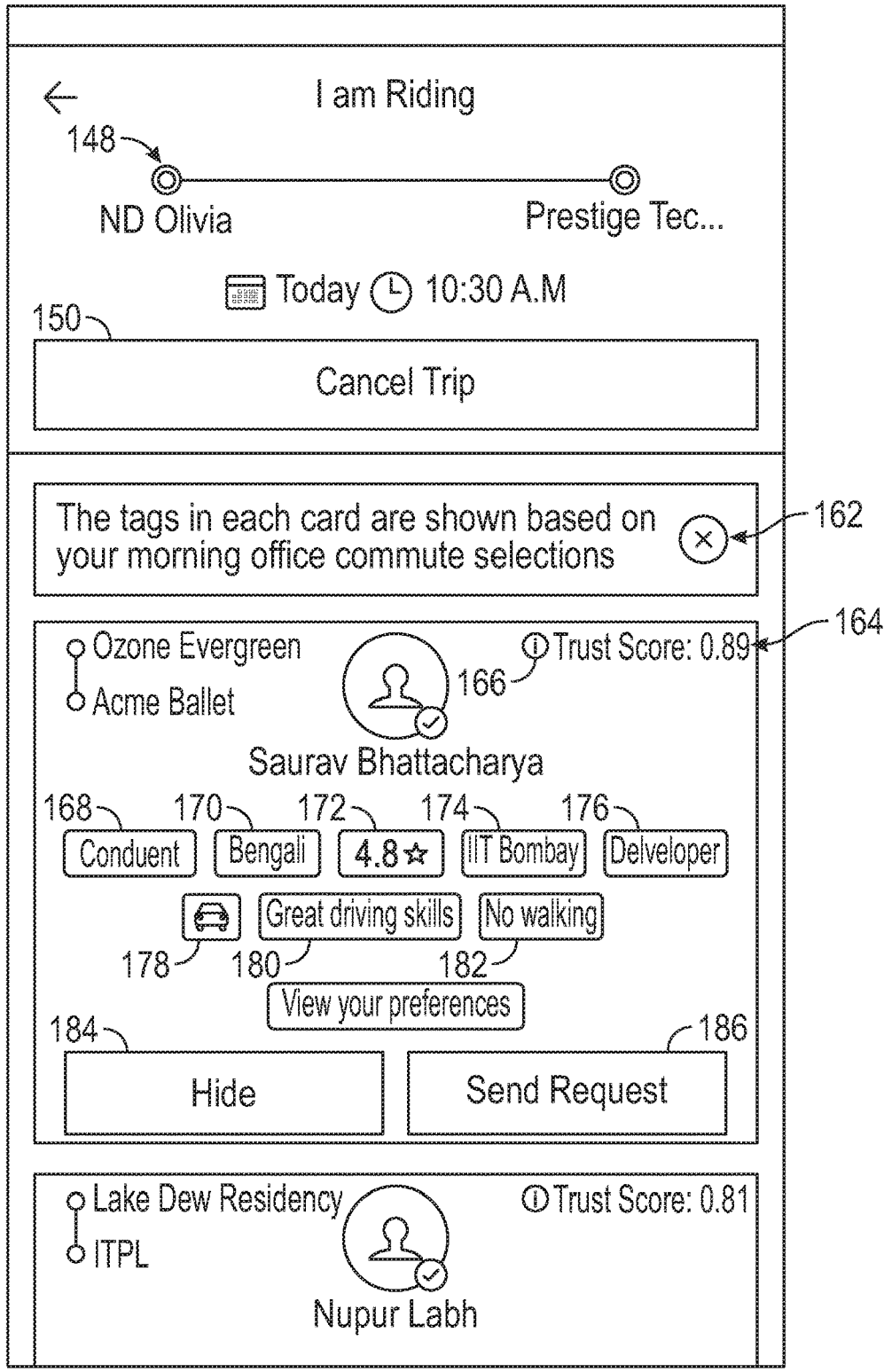
FIG. 8 illustrates a screenshot of a GUI in which a ride seeker obtains a list of options from which to select, sorted by a trust score, in accordance with an example embodiment.

FIG. 8 illustrates a screenshot of another GUI 146 in which a ride seeker obtains a list of options from which to select, sorted by a trust score, in accordance with an example embodiment. Information such as route information is graphically displayed in section 148. A graphically displayed button 150 when selected by the user can result in cancellation of the trip. Other features include a justification for shown the highlighted contextual factors, which is displayed in section 162. The system can highlight external factors that influenced prioritizing of core ad use-case case specific factors, resulting in a set of contextual factors.

Figure 9:
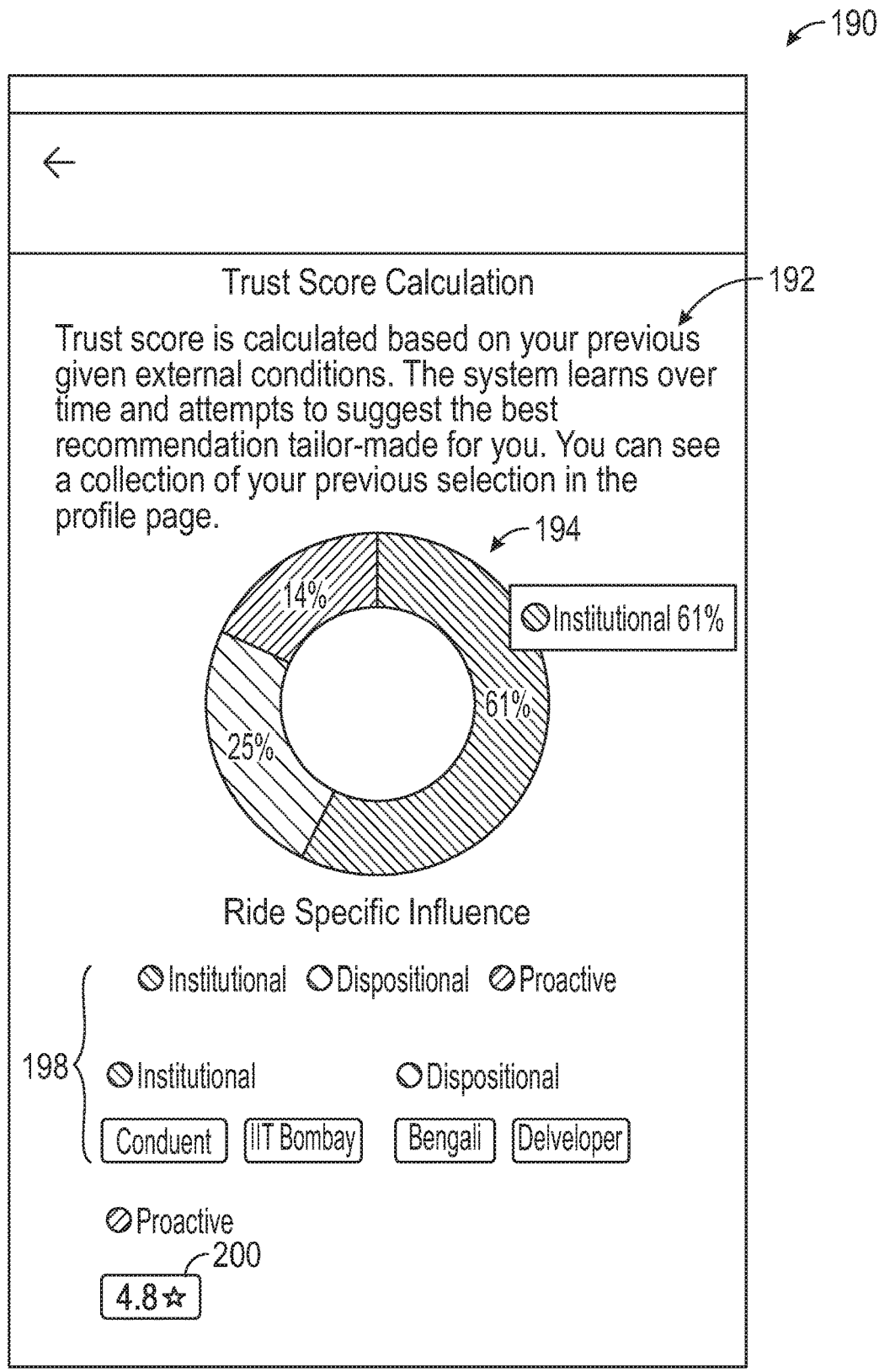
FIG. 9 illustrates a screenshot of a GUI that provides for a justification or explanation at how the trust score was calculated, in accordance with an example embodiment.

The GUI screen 146 can further display a personalized trust score 164 for each recommendation to users based on their previous preferences. The system also provides a justification 166 (e.g.; by selecting the "i" next to the trust score 164) of calculating the personalized trust score 164. In addition all contextual core and use-case specific factor values based on which the recommendation was made can be displayed via various tags, such as, for example, graphically displayed tags, 168, 170, 172, 174, 176, 178, 180, and 182. The user can also select the graphically displayed button 184 for hiding such tags. Finally, a request can be initiated by selecting the graphically displayed button 185, FIG. 9 illustrates a screenshot of a GUI 90 that provides for a justification or explanation at how the trust score was calculated, in accordance with an example embodiment. The GUI screen 90 displays a section 192 that provides a justification of calculating the personalized trust score, which includes graphically displayed information 194 and various trust factors 198 (e.g., institutional, dispositional, proactive, etc) and graphically displayed tags including, for example, a score 200.

Figure 10:
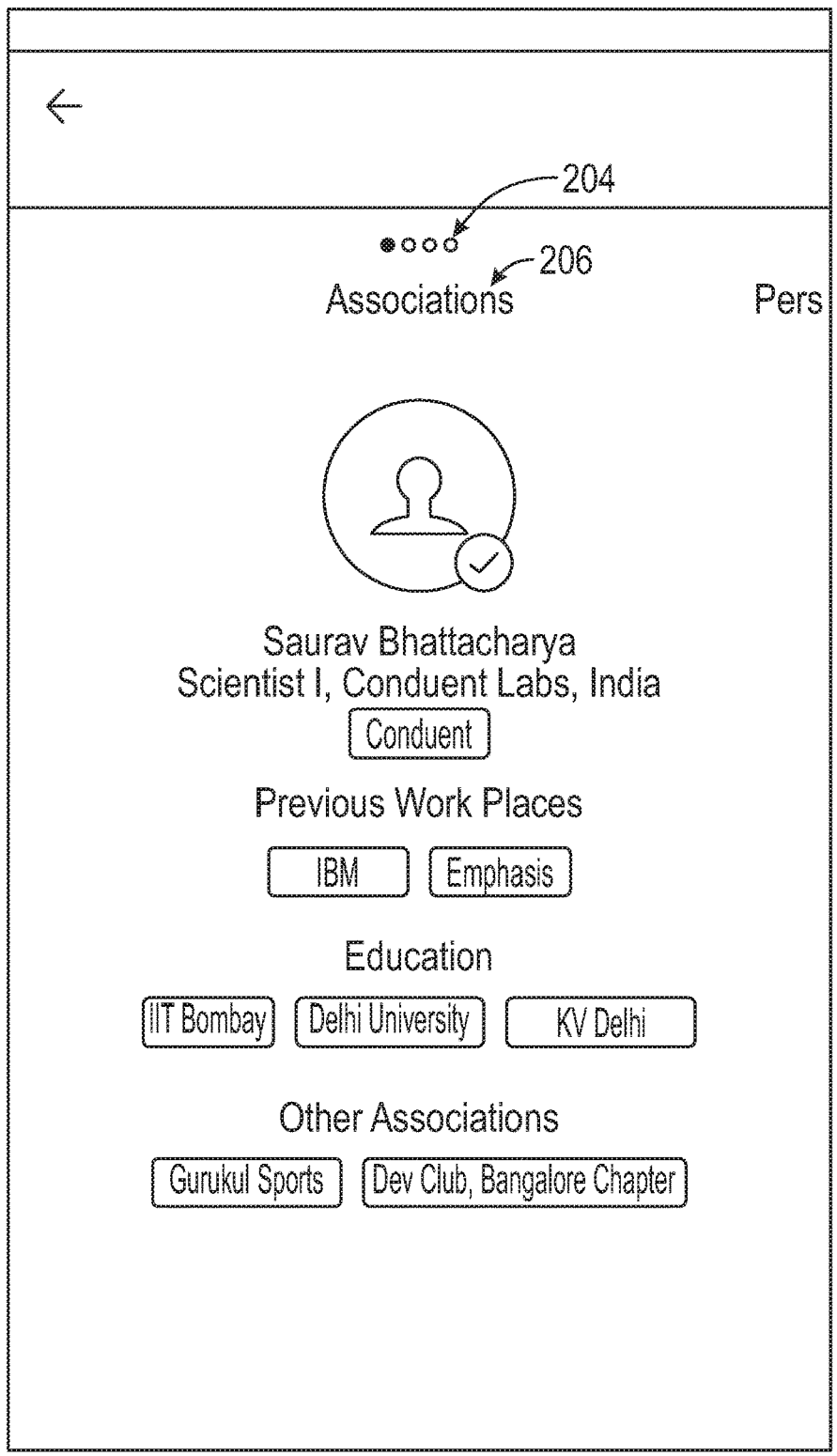
FIG. 10 illustrates a screenshot of a GUI in which a ride seeker can view detailed information regarding each ride-sharing trip on each card, in accordance with an example embodiment.

FIG. 10 illustrates a screenshot of a GUI 202 in which a ride seeker can view detailed information regarding each ride-sharing trip on each card, in accordance with an example embodiment. The GUI screen 202 allows the ride seeker to view detailed information about each trip by tapping on each card. For example, by selecting the graphically displayed dots 204, the identified categories of trust can be translated in the form of tables, wherein different tabs display the factors and their values in each category. In addition, the ordering of the tabs in the GUI can be based on the users' history of preferences. This ordering can be implemented by pressing the 'Associations' area 206.

Figure 11:
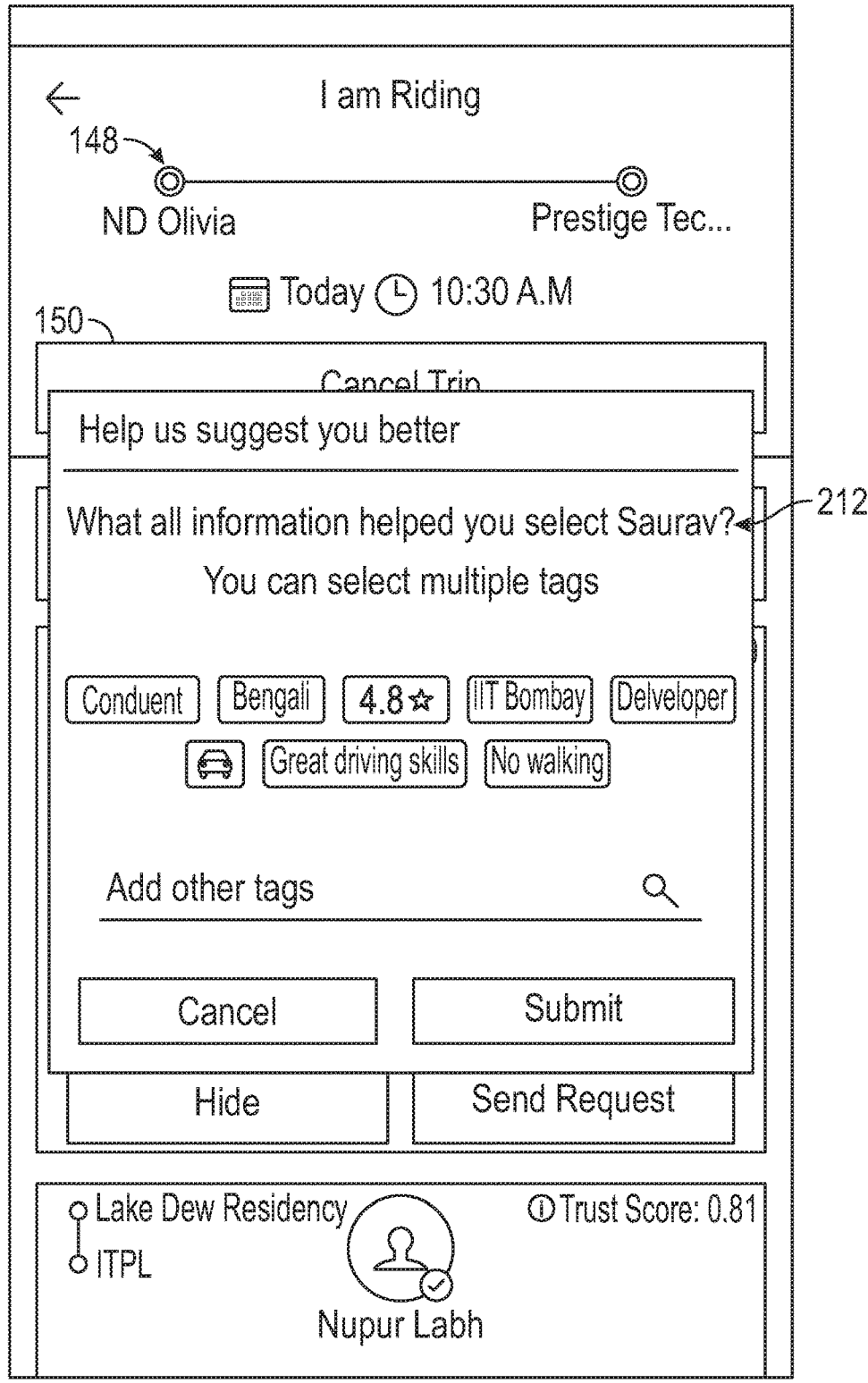
FIG. 11 illustrates a screen shot of a GUI wherein once the user confirms an entity, the system prompts the user to select factors that influenced his or her decision making, in accordance with an example embodiment.

FIG. 11 illustrates a screen shot of a mobile app GUI 210 wherein once the user confirms an entity, the system prompts the user to select factors that influenced his or her decision making, in accordance with an example embodiment. This information can be entered by a user into the graphically displayed area 212.

Figure 12:
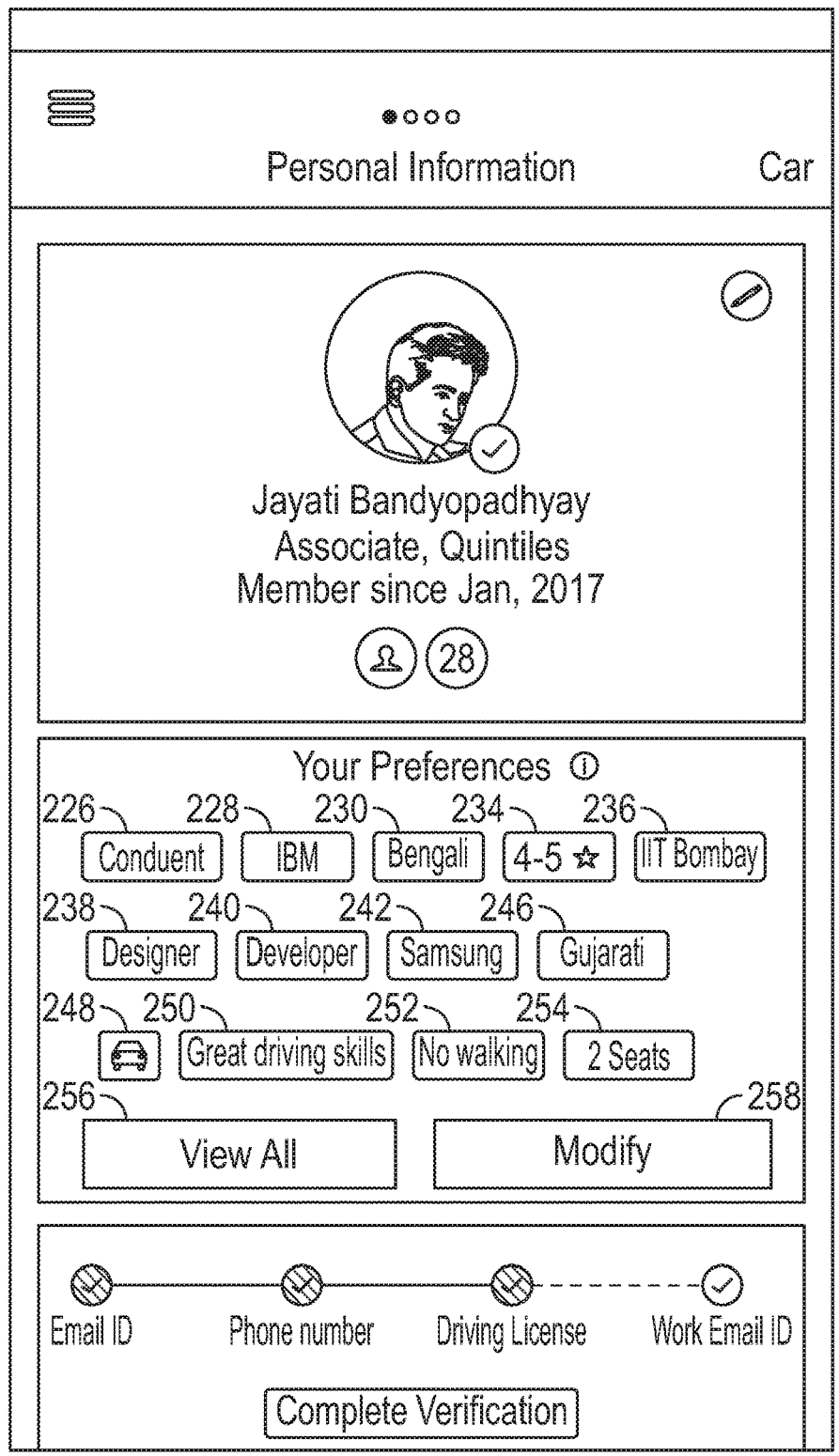
FIG. 12 illustrates a screen shot of a GUI that displays a user profile section in which preferred factor values are displayed in the form of tags, in accordance with an example embodiment.

FIG. 12 illustrates a screen shot of a mobile app GUI 220 that displays a user profile section in which preferred factor values are displayed in the form of various tags 224, in accordance with an example embodiment. Such tags can include, for example, tags, such as tags 226, 228, 230, 234, 236, 238, 240, 242, 246, 248, 250, 252, 254, and so on. Graphically displayed buttons 256 and 258 respectively offer "View All" and "Modify" selection options for the user.

Figure 13:
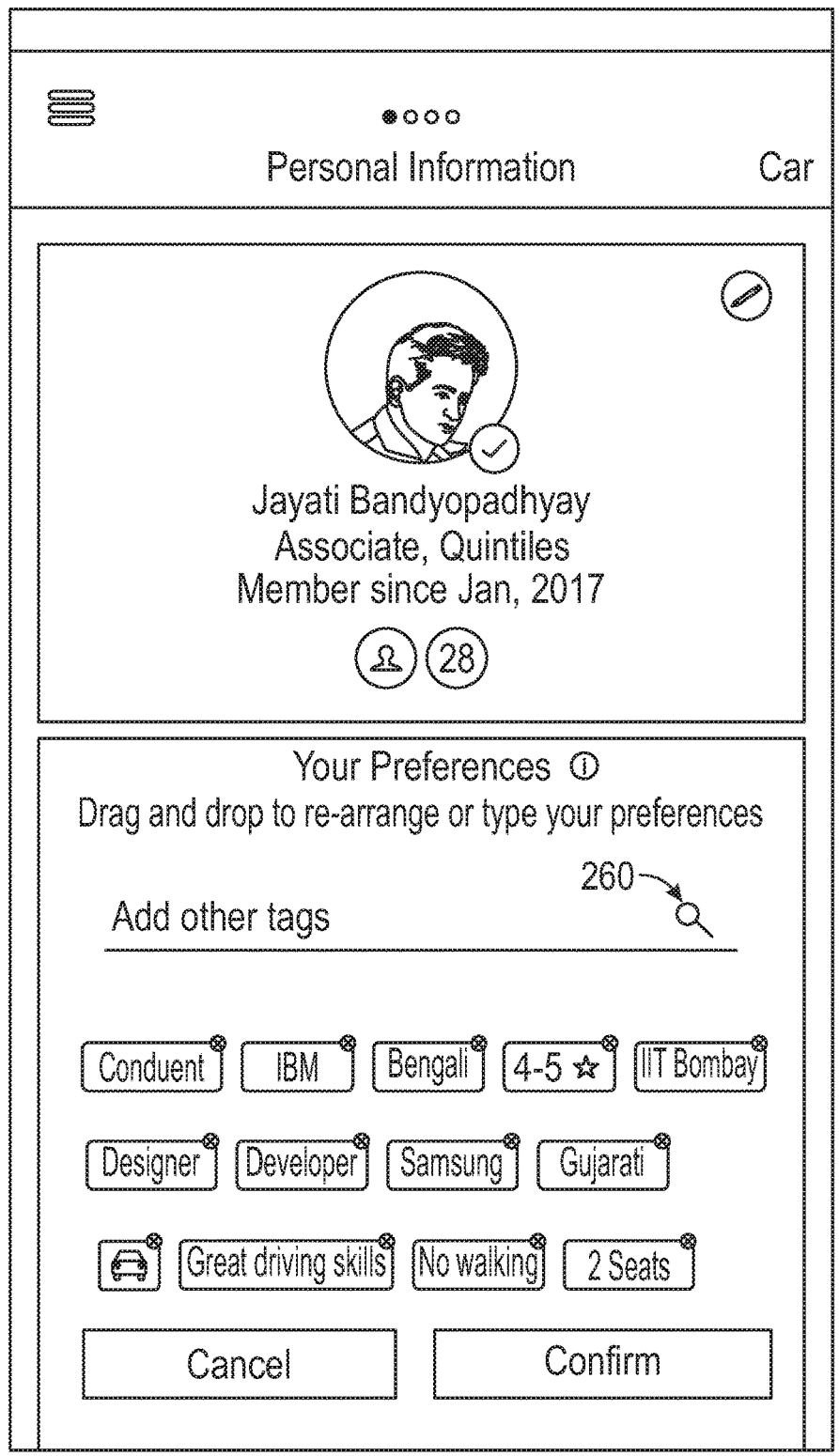
FIG. 13 illustrates a screen shot of a GUI wherein in the user profile section, the user can Add New, Re-Order and/or Delete preference tags, in accordance with an example embodiment.

FIG. 13 illustrates a variation to the screen shot of the GUI 220 wherein in the user profile section, the user can Add New, Re-Order and/or Delete preference tags, in accordance with an example embodiment. For example, user can add other tags into section 260.

Figure 14:
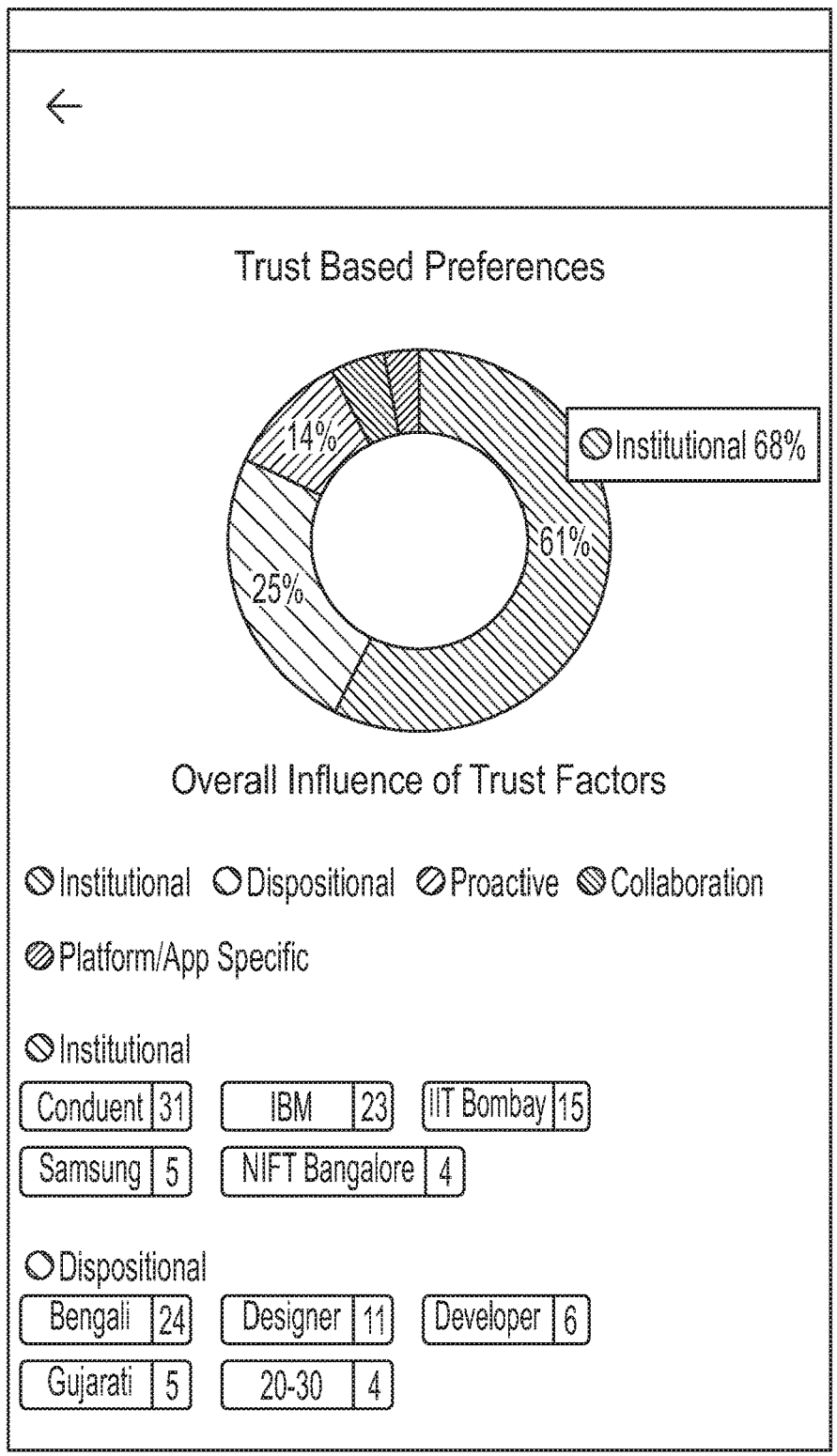
FIG. 14 illustrates a screen shot of a GUI in which users can view the influence of each trust type on their profile section and wherein the number of such occurrences are also summarized, in accordance with an example embodiment.

FIG. 14 illustrates a screen shot of a GUI 280 in which users can view the influence of each trust type on their profile section and wherein the number of such occurrences is also summarized, in accordance with an example embodiment. The GUI screen 280 thus allows a user to view the influence of each trust type on his or her profile section. The system also summarizes the number of such occurrences and displays this information for the user in GUI screen 280.

The GUI described and illustrated herein is a specialized GUI for providing personalized recommendations based on a dynamic trust model. Such a GUI offers a number of advantages over conventional GUI's because such a GUI improves the speed and accuracy with which a user can perform a task. For example, the GUI shown in FIGS. 7-14 is based on the disclosed trust framework, and structures trust based on factors such as demographic information, institutions, collaboration, pervious and repeated interactions with other users/entities and so on. Such a GUI further uses contextual bandits to automatically learn the user's dynamic trust profile with respect to changing contexts.

Such features provide a specific way of achieving personalized recommendations by providing a GUI that that dynamically displays a number of unique features that specifically improve the way the underlying device operates and displays graphical features for a user through unique operations such as how preferences and tags are displayed and interact with one another and so on. Such a GUI provides a specific implementation of a solution to a problem in the software arts.

The disclosed example embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. In this regard, a high speed printing system may be considered a special-purpose computer designed with the specific purpose of rendering or printing documents. In general, embodiments may be implemented as a method, and/or a computer program product at any possible technical detail level of integration. The computer program product may include a computer readable storage medium (or media) having computer readable program instructions thereon for causing a processor to carry out aspects of the embodiments.

The aforementioned computer program instructions may also be stored in a computer-readable memory (e.g., such as the example memory 342 shown in FIG. 11) that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams may represent a module, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 15:
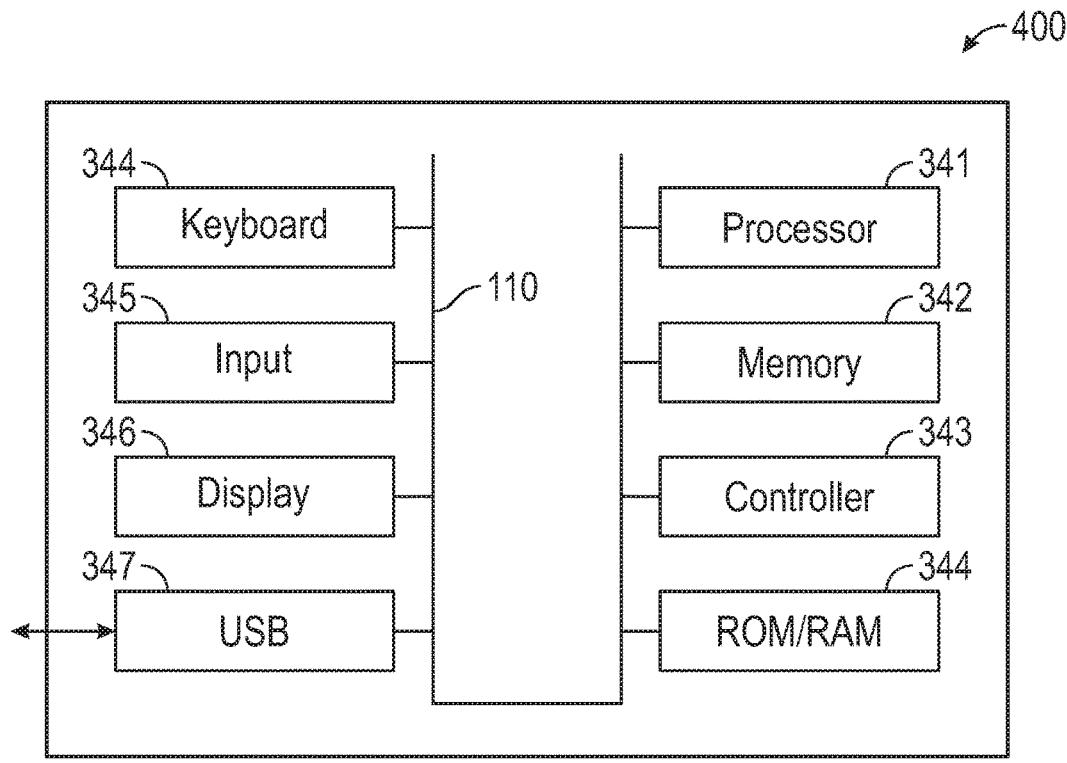
FIG. 15 illustrates a schematic view of a computer system, in accordance with an embodiment.
Figure 16:
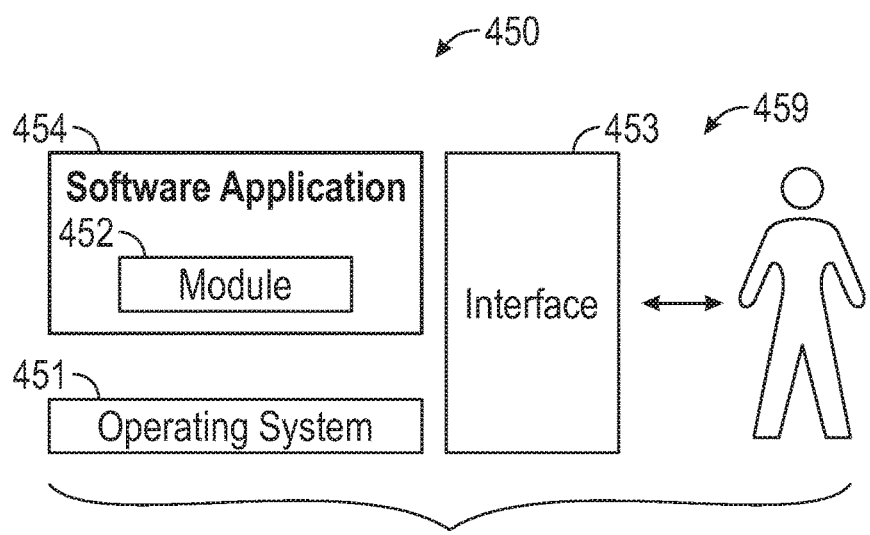
FIG. 16 illustrates a schematic view of a software system including a module, an operating system, and a user interface, in accordance with an embodiment.

FIGS. 15-16 are shown only as exemplary diagrams of data-processing environments in which example embodiments may be implemented. It should be appreciated that FIGS. 15-16 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 15, some embodiments may be implemented in the context of a data-processing system 400 that can include, for example, one or more processors such as a processor 341 (e.g., a CPU (Central Processing Unit) and/or other microprocessors), a memory 342, a controller 343, additional memory such as ROM/RAM 332 (i.e. ROM and/or RAM), a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc) and/or other peripheral connections and components.

The system bus 110 serves as the main electronic information highway interconnecting the other illustrated components of the hardware of data-processing system 400. In some embodiments, the processor 341 may be a CPU that functions as the central processing unit of the data-processing system 400, performing calculations and logic operations required to execute a program. Such a CPU, alone or in conjunction with one or more of the other elements disclosed in FIGS. 1-2 and/or FIGS. 15-16, is an example of a production device, computing device or processor. Read only memory (ROM) and random access memory (RAM) of the ROM/RAM 344 constitute examples of non-transitory computer-readable storage media.

The controller 343 can interface with one or more optional non-transitory computer-readable storage media to the system bus 110. These storage media may include, for example, an external or internal DVD drive, a CD ROM drive, a hard drive, flash memory, a USB drive or the like. These various drives and controllers can be optional devices. Program instructions, software or interactive modules for providing an interface and performing any querying or analysis associated with one or more data sets may be stored in, for example, ROM and/or RAM 344. Optionally, the program instructions may be stored on a tangible, non-transitory computer-readable medium such as a compact disk, a digital disk, flash memory, a memory card, a USB drive, an optical disc storage medium and/or other recording medium As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. The data-processing system 400 may be implemented in some embodiments as, for example, a server in a client-server based network (e.g., the Internet) or in the context of a client and a server (i.e., where aspects are practiced on the client and the server).

In some example embodiments, data-processing system 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc).

FIG. 16 illustrates a computer software system 450 for directing the operation of the data-processing system 400 depicted in FIG. 15. The software application 454, stored for example in memory 342 and/or another memory, generally includes one or more modules such as module 452. The computer software system 450 also includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as those discussed herein (e.g., the instructions/operations of method 70 shown at blocks 72 to 86 in FIG. 7 and elsewhere herein). Module 452 may also be composed of a group of modules.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. Examples of modules include the various modules 12, 14, 16 shown in FIGS. 1-2. It should be appreciate that processing of the modules 12, 14, 16 according to the approach described herein can lead to improvements in processing speed and ultimately in energy savings and efficiencies in a data-processing system such as, for example, the data-processing system 400 shown in FIG. 15. A module can perform the various steps, operations or instructions such as shown in FIG. 4.

FIGS. 15-16 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

It is understood that the specific order or hierarchy of steps, operations, or instructions in the processes or methods disclosed is an illustration of exemplary approaches. For example, the various steps, operations or instructions shown in the various blocks in FIG. 4 can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. For example, improvements in computer processing time means that the computing system employing the processor and related components (i.e., the "data-processing system") will experience overall improvements in processing speed along with energy savings (i.e., due to a decrease in the amount of time it takes to process a forecasting operation).

The disclosed embodiments offer technical improvements to a computer-technology such as a data-processing system, and further provide for a non-abstract improvement to a computer technology via a technical solution to the technical problem(s) identified in the background section of this disclosure. The ability to provide recommendations of trust in a fast and efficient manner, particularly in computing applications (e.g., ride share applications) requiring increased efficiencies in processing data will also lead to improved efficiencies such as in memory management and processing in the underlying computer technology.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for personalized trust recommendation based on a dynamic trust model, said method comprising:
    deriving a trust framework from a set of core trust factors in association with use-case specific factors and situational factors;
    collecting invasive data and non-invasive data from a user based on activity data and profile data of said user;
    creating a circle of trust for said user and a dynamic trust profile for said user based on said invasive data and said non-invasive data collected from said user; and
    providing a recommended level of trustworthiness to said user with respect to a situation or entity within said trust framework and based on said dynamic trust profile and said circle of trust for said user and which is personalized to said user.

2. The method of claim 1 wherein said providing said recommended level of trustworthiness further comprises:
    calculating a trust score based on said dynamic trust profile of said user, such that said recommended level of trustworthiness includes said trust score.

3. The method of claim 1 wherein said activity data includes usage data associated with said user.

4. The method of claim 1 wherein said core trust factors include at least one of the following factors: demographic information, institutional information, collaboration, emotions, and pervious and repeated interactions with other users.

5. The method of claim 1 wherein said invasive data comprises self-reporting feedback data provided by said user and said non-invasive data comprises data indicative of a usage by said user of a software application and features associated with said application.

6. The method of claim 1 wherein said providing said recommended level of trustworthiness to said user, further includes dynamically learning weights of trust factors longitudinally to personalize said trust framework for said user, wherein said recommended level of trustworthiness is further based on said dynamically learned weights of trust factors.

7. The method of claim 1 wherein said creating said dynamic trust profile for said user, further includes using contextual bandits to automatically learn said dynamic trust profile of said user with respect to changing contexts.

8. The method of claim 7 wherein said contextual bandits are based on a set of actions that is infinite and a subset of said of actions is available in a trial, wherein a bandit associated with said contextual bandits pulls several arms in said trial in a ranked order and estimates a rank thereof while considering a diversity of said actions.

9. A system for personalized trust recommendation based on a dynamic trust model, said system comprising:
    at least one processor and a memory, said memory storing instructions to cause said at least one processor to perform:
        deriving a trust framework from a set of core trust factors in association with use-case specific factors and situational factors;
        collecting invasive data and non-invasive data from a user based on activity data and profile data of said user;
        creating a circle of trust for said user and a dynamic trust profile for said user based on said invasive data and said non-invasive data collected from said user; and providing a recommended level of trustworthiness to said user with respect to a situation or entity within said trust framework and based on said dynamic trust profile and said circle of trust for said user and which is personalized to said user.

10. The system of claim 9 wherein said instructions for providing said recommended level of trustworthiness, further comprises instructions configured for calculating a trust score based on said dynamic trust profile of said user, such that said recommended level of trustworthiness includes said trust score.

11. The system of claim 9 wherein said activity data includes usage data associated with said user.

12. The system of claim 9 wherein said core trust factors include at least one of the following factors: demographic information, institutional information, collaboration, emotions, and pervious and repeated interactions with other users.

13. The system of claim 9 wherein said invasive data comprises self-reporting feedback data provided by said user and said non-invasive data comprises data indicative of a usage by said user of a software application and features associated with said application.

14. The system of claim 9 wherein said instructions for providing said recommended level of trustworthiness to said user, further includes instructions configured for: dynamically learning weights of trust factors longitudinally to personalize said trust framework for said user, wherein said recommended level of trustworthiness is further based on said dynamically learned weights of trust factors.

15. The system of claim 9 wherein said instructions for creating said dynamic trust profile for said user, further includes instructions configured for: using contextual bandits to automatically learn said dynamic trust profile of said user with respect to changing contexts.

16. The system of claim 15 wherein said contextual bandits are based on a set of actions that is infinite and a subset of said of actions is available in a trial, wherein a bandit associated with said contextual bandits pulls several arms in said trial in a ranked order and estimates a rank thereof while considering a diversity of said actions.

17. A computer program product for personalized trust recommendation based on a dynamic trust model, said computer program product comprising a non-transitory computer readable storage medium having stored thereon, program instructions executable by a device to:
derive a trust framework from a set of core trust factors in association with use-case specific factors and situational factors;
collect invasive data and non-invasive data from a user based on activity data and profile data of said user;
create a circle of trust for said user and a dynamic trust profile for said user based on said invasive data and said non-invasive data collected from said user; and
provide a recommended level of trustworthiness to said user with respect to a situation or entity within said trust framework and based on said dynamic trust profile and said circle of trust for said user and which is personalized to said user.

18. The computer program product of claim 17 wherein said instructions for providing said recommended level of trustworthiness further comprises instructions configured: calculating a trust score based on said dynamic trust profile of said user, such that said recommended level of trustworthiness includes said trust score.

19. The computer program product of claim 17 wherein said activity data includes usage data associated with said user and wherein said core trust factors include at least one of the following factors: demographic information, institutional information, collaboration, emotions, and pervious and repeated interactions with other users.

20. The computer program product of claim 17 wherein said invasive data comprises self-reporting feedback data provided by said user and said non-invasive data comprises data indicative of a usage by said user of a software application and features associated with said application.

* * * * *